United States Patent
Garner

(10) Patent No.: US 9,222,174 B2
(45) Date of Patent: *Dec. 29, 2015

(54) CORROSION INHIBITOR COMPRISING CELLULOSE NANOCRYSTALS AND CELLULOSE NANOCRYSTALS IN COMBINATION WITH A CORROSION INHIBITOR

(71) Applicant: Nanohibitor Technology Inc., Vancouver (CA)

(72) Inventor: Andrew Garner, Vancouver (CA)

(73) Assignee: NANOHIBITOR TECHNOLOGY INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/150,749

(22) Filed: Jan. 8, 2014

(65) Prior Publication Data

US 2015/0008371 A1    Jan. 8, 2015

Related U.S. Application Data

(63) Continuation-in-part of application No. 13/935,477, filed on Jul. 3, 2012, and a continuation-in-part of application No. 13/935,483, filed on Jul. 4, 2013, now abandoned.

(51) Int. Cl.
*C23F 11/10* (2006.01)
*C10M 145/40* (2006.01)
(Continued)

(52) U.S. Cl.
CPC .............. *C23F 11/10* (2013.01); *C10M 145/40* (2013.01); *C10M 171/06* (2013.01);
(Continued)

(58) Field of Classification Search
CPC .......... C23F 11/00; C23F 11/04; C23F 11/06; C23F 11/10; C23F 11/122
USPC ............................................ 422/7, 12, 13, 16
See application file for complete search history.

(56) References Cited

U.S. PATENT DOCUMENTS

| 4,134,959 A | 1/1979 | Menke et al. |
| 4,378,381 A | 3/1983 | Turbak et al. |

(Continued)

FOREIGN PATENT DOCUMENTS

| EP | 0 541 318 A1 | 5/1993 |
| EP | 0 468 710 B1 | 5/2000 |

(Continued)

OTHER PUBLICATIONS

Modiya et al. Synthesis and screening of antibacterial and antifungal activity of 5-chloro-1,3-benzoxazol-2(3 h)-one derivative. Organic and Medicinal Chemistry Letters 2012, 2:29.*

(Continued)

*Primary Examiner* — Sean E Conley
*Assistant Examiner* — Donald Spamer
(74) *Attorney, Agent, or Firm* — Cameron IP

(57) ABSTRACT

The present invention relates to a corrosion inhibitor comprising cellulose nanocrystals. According to another aspect, there is provided a corrosion-inhibiting agent essentially consisting of a plurality of cellulose nanocrystals. The above set out cellulose nanocrystals may be in free form, such as acid-form cellulose nanocrystals, in one embodiment and added to a carrier. The cellulose nanocrystals may be effective in inhibiting ferrous and non-ferrous metals. According to a further aspect, the invention relates to a corrosion-inhibiting composition comprising a corrosion inhibitor and the above set out corrosion-inhibiting agent in an effective combination to inhibit corrosion of metals. The composition may be effective in inhibiting ferrous metals when the cellulose nanocrystals are in either salt or free form. The composition may be effective in inhibiting corrosion of both ferrous and non-ferrous metals when the cellulose nanocrystals are in free form.

9 Claims, 5 Drawing Sheets

(51) Int. Cl.
    *C10M 171/06*     (2006.01)
    *C23F 11/173*     (2006.01)
    *C10M 173/02*     (2006.01)
    *B82Y 30/00*     (2011.01)
    *C23F 11/14*     (2006.01)
    *C23F 11/12*     (2006.01)

(52) U.S. Cl.
CPC ........... *C10M 173/02* (2013.01); *C23F 11/143* (2013.01); *C23F 11/173* (2013.01); *B82Y 30/00* (2013.01); *C10M 2207/141* (2013.01); *C10M 2209/12* (2013.01); *C10M 2215/223* (2013.01); *C10N 2220/082* (2013.01); *C10N 2220/086* (2013.01); *C10N 2230/12* (2013.01); *C10N 2240/401* (2013.01); *C23F 11/124* (2013.01); *C23F 11/149* (2013.01)

(56) References Cited

U.S. PATENT DOCUMENTS

| | | |
|---|---|---|
| 4,402,747 A | 9/1983 | Bird et al. |
| 4,536,302 A | 8/1985 | Augsburger et al. |
| 4,587,028 A | 5/1986 | Darden |
| 4,675,158 A | 6/1987 | Klindera |
| 5,080,818 A | 1/1992 | Tachiiwa et al. |
| 5,326,529 A | 7/1994 | Miksic et al. |
| 5,352,383 A | 10/1994 | Johnson et al. |
| 5,597,514 A | 1/1997 | Miksic et al. |
| 5,616,544 A | 4/1997 | Kalota et al. |
| 5,750,053 A | 5/1998 | Miksic et al. |
| 5,854,145 A | 12/1998 | Chandler et al. |
| 6,033,599 A | 3/2000 | Lozano et al. |
| 6,085,905 A | 7/2000 | Miksic et al. |
| 6,103,790 A | 8/2000 | Cavaille et al. |
| 6,280,528 B1 | 8/2001 | Kharshan et al. |
| 6,306,210 B1 | 10/2001 | Miksic et al. |
| 6,576,155 B1 | 6/2003 | Barbera-Guillem |
| 6,585,933 B1 | 7/2003 | Ehrhardt et al. |
| 6,800,594 B2 | 10/2004 | Miksic et al. |
| 6,982,062 B2 | 1/2006 | DeCordt et al. |
| 7,014,694 B1 | 3/2006 | Miksic et al. |
| 7,048,873 B1 | 5/2006 | Miksic et al. |
| 7,118,615 B1 | 10/2006 | Miksic et al. |
| 7,125,441 B1 | 10/2006 | Furman et al. |
| 7,241,391 B1 | 7/2007 | Miksic et al. |
| 7,264,707 B1 | 9/2007 | Furman et al. |
| 7,297,191 B1 | 11/2007 | Miksic et al. |
| 7,541,089 B1 | 6/2009 | Miksic et al. |
| 7,588,820 B2 | 9/2009 | Berg et al. |
| 7,708,939 B2 | 5/2010 | Duke et al. |
| 7,763,213 B2 | 7/2010 | Miksic et al. |
| 8,241,765 B2 | 8/2012 | Barbera-guillem |
| 8,460,572 B2 | 6/2013 | Boluk et al. |
| 2005/0017220 A1 | 1/2005 | DeCordt et al. |
| 2005/0137291 A1 | 6/2005 | Schneider |
| 2005/0256262 A1 | 11/2005 | Hill et al. |
| 2007/0196975 A1 | 8/2007 | Nomura et al. |
| 2008/0146701 A1 | 6/2008 | Sain et al. |
| 2008/0305182 A1* | 12/2008 | Ramirez et al. ............... 424/616 |
| 2010/0098987 A1 | 4/2010 | Woyciesjes et al. |
| 2010/0119736 A1 | 5/2010 | Yan et al. |
| 2010/0143681 A1 | 6/2010 | Yano et al. |
| 2010/0279019 A1 | 11/2010 | Beck et al. |
| 2010/0327215 A1 | 12/2010 | Boluk et al. |
| 2011/0101240 A1 | 5/2011 | Barbera-Guillem |
| 2012/0015176 A1 | 1/2012 | Riebel et al. |
| 2013/0048917 A1 | 2/2013 | Virtanen et al. |
| 2013/0065026 A1 | 3/2013 | Walther et al. |
| 2013/0145957 A1 | 6/2013 | Shchukin et al. |
| 2013/0273350 A1 | 10/2013 | Lee et al. |
| 2013/0345341 A1 | 12/2013 | Harada et al. |
| 2014/0004340 A1 | 1/2014 | Saastamoinen et al. |

FOREIGN PATENT DOCUMENTS

| | | |
|---|---|---|
| EP | 0990676 B1 | 5/2006 |
| EP | 2 236 664 A1 | 10/2010 |
| EP | 2 305 747 A1 | 6/2011 |
| WO | WO 01/66600 A1 | 2/2001 |
| WO | WO 2008/069936 A1 | 6/2008 |
| WO | 2010062002 A1 | 6/2010 |
| WO | WO 2010/066036 A1 | 6/2010 |
| WO | 2011/124759 A1 | 10/2011 |
| WO | 2013/033562 A2 | 3/2013 |
| WO | 2013/134062 A1 | 9/2013 |

OTHER PUBLICATIONS

The Organics Institute. 10 Tips on How to Avoid Harmful Preservatives in Your Diet. Jul. 30, 2012.*
Beck-Candanedo et al. Effect of reaction conditions on the properties and behavior of wood cellulose nanocrystal suspensions. Biomacromolecules 2005, 6, 1048-1054.*
Hirai et al. Phase separation behavior in aqueous suspensions of bacterial cellulose nanocrystals prepared by sulfuric acid treatment. Langmuir, 25, 497-502.*
"Nanocrystalline Cellulose, Material Safety Data Sheet", prepared by FPInnovations on Oct. 31, 2011, revised on Apr. 16, 2012.
"Ammonium". Wikipedia. Archived version from May 24, 2011.
"Ethylene Glycol". Wikipedia. Archived version from May 13, 2011.
"Propylene Glycol". Wikipedia. Archived version from May 18, 2011.
"Cellulose". Wikipedia. Archived version from May 17, 2011.
Baker, A. J., "Corrosion of Metal in Wood Products," Durability of Building Materials and Components. ASTM STP 691. P. J. Sereda and G. G. Litvan, Eds., American Society . . . for Testing and Materials, 1980, pp. 981-993.
"Guides to practice in Corrosion Control: Corrosion of Metals by Wood", as set out in www.npl.co.uk/upload/pdf/corrosion_of_metals_by_wood.pdf, National Physical Laboratory . . . Hampton Road, Teddington, Middlesex, TW11 0LW, England.
Hamad Wy and Hu TQ. "Structure-process-yield interrelations in nanoorystalline cellulose extraction", The Canadian Journal of Chemical Engineering, Jun. 2010, pp. 392-402 . . . vol. 88, Vancouver, Canada.
Hasani et al. Cationic Surface functionalization of cellulose nanocrystals. Soft Matter, 2008, 4, 2238-2244.
"Guides to practice in Corrosion Control: Corrosion of Metals by Wood", as set out in www.npl.co.uk/upload/pdf/corrosion_of_metals_by_wood.pdf, National Physical Laboratory . . . Hampton Road, Teddington, Middlesex, TW11 0LW, England, and as found on Internet Archive: Wayback Machine, dated: Mar. 4, 2011, . . . (http://web.archive.org/web/20110304051809/http://www.npl.co.uk/upload/pdf/corrosion_of_metals_by_wood.pdf).
International Search Report and Written Opinion for PCT/CA2014/000544, dated Oct. 28, 2014.
"Cooking Molasses", Jan. 17, 2011, Crosby Molasses Co. Ltd., Saint John, New Brunswick, Canada.
"Lactose (Milk Sugar)" (date unknown), Waspie Valley Creamery Inc., Iowa, USA.
"Barley Malt Syrup" from Wikipedia, Jul. 18, 2009, as found on the WayBack Machine . . . https://web.archive.org/web/20090718041523/http://en.wikipedia.org/wiki/Barley_malt_syrup.
"Reducing Sugar" from Wikipedia, Nov. 13, 2011, as found on the WayBack Machine . . . http://web.archive.org/web/20111113231505/http://en.wikipedia.org/wiki/Reducing_sugar.
"Molasses" from Wikipedia, Nov. 16, 2011, as found on the WayBack Machine . . . http://web.archive.org/web/20111116035405/http://en.wikipedia.org/wiki/Molasses.
"Sucrose" from Wikipedia, Sep. 25, 2011, as found on the WayBack Machine . . . http://web.archive.org/web/20110925231354/http://en.wikipedia.org/wiki/Sucrose.

* cited by examiner

CORROSION INHIBITOR COMPRISING CELLULOSE NANOCRYSTALS AND CELLULOSE NANOCRYSTALS IN COMBINATION WITH A CORROSION INHIBITOR

CROSS REFERENCE TO RELATED APPLICATIONS

This is a continuation-in-part application which claims the benefit of application Ser. No. 13/935,477 filed in the United States Patent and Trademark Office on Jul. 3, 2013, and which claims the benefit of application Ser. No. 13/935,483 filed in the United States Patent and Trademark Office on Jul. 4, 2013, the disclosures of which are incorporated herein by reference and priority to which is claimed.

FIELD OF THE INVENTION

The present invention relates to corrosion inhibition. In particular, the invention relates to a corrosion inhibitor comprising cellulose nanocrystals, as well as cellulose nanocrystals in combination with a corrosion inhibitor for inhibiting corrosion.

DESCRIPTION OF THE RELATED ART

Corrosion inhibitors per se are well known to those skilled in the art. They may function to inhibit the extent to which a metal corrodes, thereby acting to extend the life of metal-containing industrial equipment, infrastructure, consumer goods and the like. Corrosion inhibitors may thus be useful across a wide range of industries.

Some inhibitors, such as azole compounds, are widely known to those skilled in the art and may be effective in a variety of applications. For example, U.S. Pat. No. 4,134,959 to Menke et al. provides a composition and method for inhibiting corrosion. The composition consists essentially of an azole and a water-soluble phosphate in an effective combination to inhibit corrosion in both ferrous and non-ferrous metals. However, azole compounds may be relatively expensive.

On the other hand, other inhibitors may be less costly but not as effective at inhibiting corrosion compared to some more costly inhibitors.

Still further inhibitors may satisfy one or more of the above criteria regarding effectiveness and cost, but may cause residual and harmful effects to the environment.

There is accordingly a need for a corrosion inhibitor that overcomes the above disadvantages.

BRIEF SUMMARY OF INVENTION

It is object of the present invention to provide, and the present invention discloses herein, a corrosion inhibitor comprising cellulose nanocrystals, and cellulose nanocrystals in combination with a corrosion inhibitor, which overcome the above disadvantages.

There is accordingly provided a corrosion inhibitor comprising cellulose nanocrystals. There is also provided a corrosion-inhibiting agent essentially consisting of a plurality of cellulose nanocrystals. The above set out cellulose nanocrystals may be in free form, such as acid-form cellulose nanocrystals, according to one embodiment, and added to a carrier. The cellulose nanocrystals may be effective in inhibiting ferrous and non-ferrous metals.

There is further provided a corrosion-inhibiting composition comprising a corrosion inhibitor and the above set out corrosion-inhibiting agent in an effective combination to inhibit corrosion of metals. According to another aspect, there is provided a plurality of cellulose nanocrystals in an effective combination with a corrosion inhibitor for use as a corrosion-inhibiting composition. The compositions may be effective in inhibiting ferrous metals when the cellulose nanocrystals are in either salt or free form. The compositions may be effective in inhibiting corrosion of both ferrous and non-ferrous metals when the cellulose nanocrystals are in free form.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
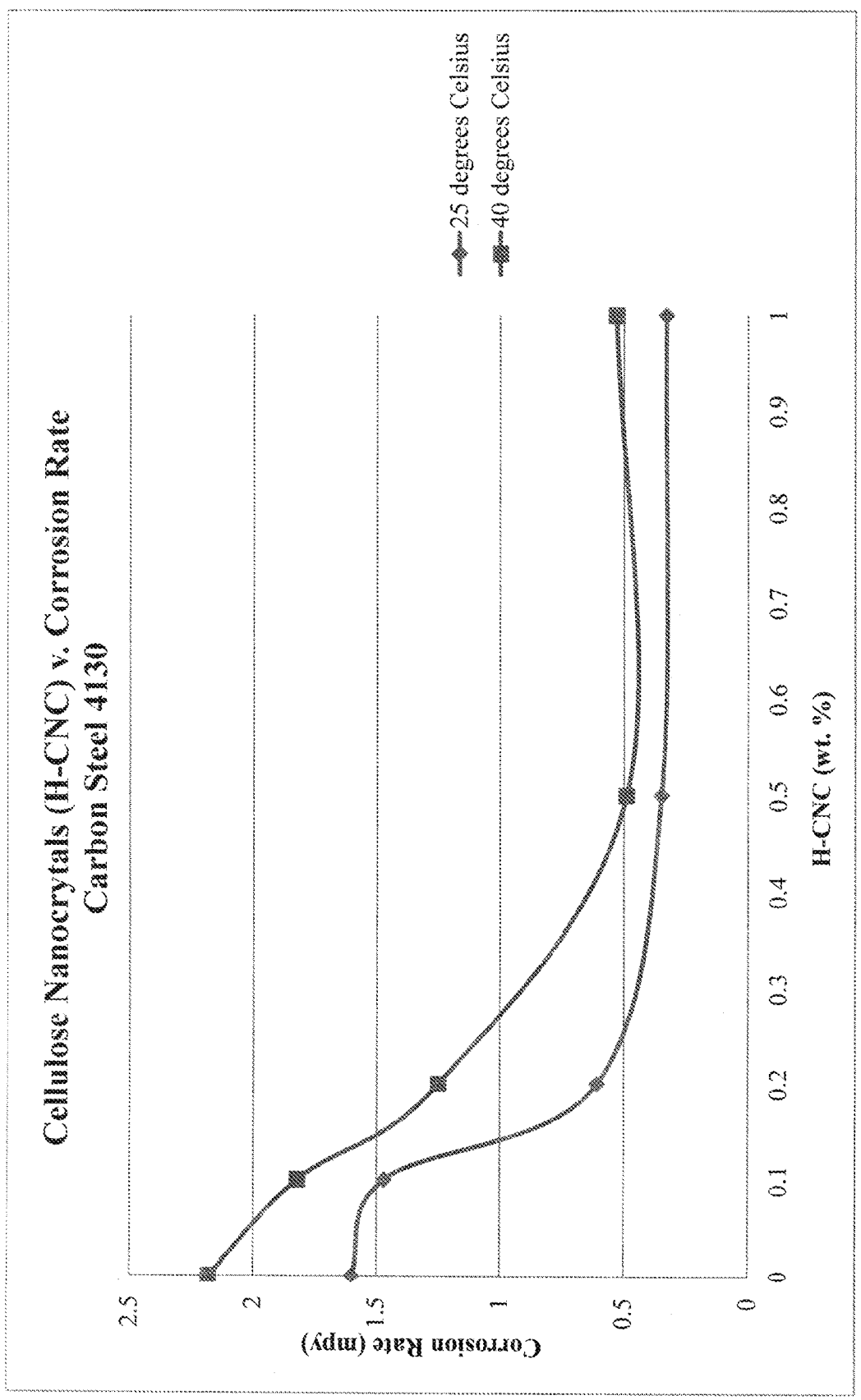
FIG. 1 is a line graph of showing the results of a coupon jar test for carbon steel 4130 in which acid form cellulose nanocrystals ("H—CNC") were added in varying amounts to sea-salt solutions, where corrosion rate in mils per year (mpy) is shown as a function of the amount of H—CNC as a percentage by weight of the carrier.

Cellulose nanocrystals are typically in the form of rod shaped fibrils or needles. The fibrils may, for example, have a length/diameter ratio of about 20 to 200, a diameter preferably less than about 60 nm, a diameter more preferably in the range of 4 nm to about 15 nm, and a length of about 150 nm to about 350 nm. Cellulose nanocrystals as referred to herein may alternatively be referred to as cellulose nanocrystals (trademark), cellulose nanofibres or cellulose whiskers. Cellulose nanocrystals may be purchased at CelluForce Inc., which has an office at 625 President Kennedy, Montréal, Québec, H3A 1K2.

1. Salt-Form Cellulose Nanocrystals as a Corrosion Inhibitor for Metals 1.1 Ferrous Metal and Salt-Form Cellulose Nanocrystals It was found that salt-form cellulose nanocrystals alone, when added to a carrier such as salty water, have generally no readily discernible beneficial effect on the corrosion rate for ferrous metals. This is evidenced by the below set out in representative Example 1.

EXAMPLE 1

Corrosion rates were obtained by immersing coupons of ferrous metal, in this example a common steel in this case carbon steel 4130, in typical seawater compositions for 34 days and then removing the coupons. The loss of the mass of the coupons arising from the corrosion was then measured. The coupons were tested at an ambient temperature of approximately 25 degrees Celsius. The coupons were kept within jars, with each jar having a lid with an aperture extending therethrough.

The masses of the coupons were determined before and after the 34 day period to an accuracy of $\pm 10^{-5}$ grams. Mils per year (mpy) rates were obtained thereby following the protocol outlined in the NACE International Corrosion Engineers Reference Book, $2^{nd}$ Edition, as set out on pages 78 and 79 therein. This book may be obtained at NACE International, which has an address at 1440 South Creek Drive, Houston, Tex., 7084-4906, USA.

Each of the jars contained a carrier, in this example in the form of water in the amount of 800 grams. Each of the jars also included 28.8 grams of sea salt in this example. Each jar thus had sea salt in the amount of 3.6 percent by weight of the water, approximating typical sea water. The sea salt used in this example and all other examples set out below was Agenco (trademark) sea salt, which may be purchased at Whole Foods Market IP. L.P., having an address at 2285 W 4th Ave, Vancouver, British Columbia, Canada.

Dried, salt-form cellulose nanocrystals, in this example sodium-form cellulose nanocrystals, were added to selective ones of the jars in various amounts. The sodium-form cellulose nanocrystals may be referred to as a compound of formula $R_3$—$R_2$ in which $R_3$ is a sodium atom (Na) and $R_2$ is a cellulose nanocrystal (CNC). Sodium-form cellulose nanocrystals may be hereinafter referred to as Na—CNC.

The Na—CNC was obtained by first extracting the cellulose nanocrystals, and thus Obtaining purified cellulose nanocrystal, through acid hydrolysis. The cellulose nanocrystals so extracted then had their proton counterions replaced with monovalent cationic counterions to obtain the dried solid form Na—CNC. The details of this process are set out, for example, in International Patent Publication No. WO 2010/066036 A1 to Beck et al., the disclosure of which Is incorporated herein by reference. In this example, the monovalent cationic counterions are sodium ions. However, other forms of monovalent cationic counterions may be used, such as $K^+$, $Li^+$, $NH_4^+$ and tetraalkylammonium ($R_4N^+$), protonated trialkylammonium ($HR_3N^+$), protonated dialkylammonium ($H_2RaN^+$), and protonated monoalkylammonium ($H_3RN^+$) ions for example.

The dried-form Na—CNC as described above, was added in amounts of 0, 0.8, 1.6, 4.0 and 8.0 grams to respective ones of the jars. The amounts of Na—CNC correspond to compositions having amounts of Na—CNC of 0, 0.1, 0.2, 0.5 and 1.0, respectively, as a percentage by weight of the carrier. The results of the testing are set out in Table 1 below.

TABLE 1

| Steel Corrosion Rates (mpy) at 25° C. | | | | | |
|---|---|---|---|---|---|
| Na—CNC (wt. %) | 0 | 0.1 | 0.2 | 0.5 | 1.0 |
| Corrosion rate (mpy) | 1.60 | 1.71 | 1.43 | 1.62 | 1.77 |

As seen from Table 1, the corrosion rate increased from 1.60 to 1.71 mpy when the amount of Na—CNC was increased from 0 to 0.1 percent by weight of the carrier. The corrosion rate increased from 1.62 to 1.77 mpy when the amount of Na—CNC was increased from 0.5 to 1.0 percent by weight of the carrier. It was found that the corrosion rate decreased slightly from 1.60 mpy to 1.43 mpy when the amount of Na—CNC was increased from 0 to 0.2 percent by weight of the carrier.

1.2 Non-Ferrous Metal and Salt-Form Cellulose Nanocrystals

It was also found that sodium-form cellulose nanocrystals alone, when added to a carrier such as salty water, have generally no readily discernible beneficial effect on the corrosion rate for non-ferrous metals. This is evidenced by the below set out representative Example 2.

EXAMPLE 2

Corrosion rates were obtained by immersing coupons of non-ferrous metals, in this example aluminium, in this case aluminium 2024-T3, and brass, in this case UNS C27000 Yellow Brass, in typical seawater compositions. The coupons were tested at an ambient temperature of approximately 25 degrees Celsius and were kept within sealed jars in this example. The masses of the coupons were determined before and after a 32 day period to an accuracy of $\pm 10^{-5}$ grams. Mils per year (mpy) rates were obtained thereby following the protocol outlined in the NACE International Corrosion Engineers Reference Book, $2^{nd}$ Edition, as set out on pages 78 and 79 therein.

In this example, each of the jars contained a carrier in the form of 500 grams of water. Each of the jars also included 25 grams of sea salt. Each jar thus had sea salt in an amount of 5 percent by weight of the carrier. Dried, salt form cellulose nanocrystals, in this example sodium-form cellulose nanocrystals (Na—CNC), were added to selective ones of the jars in various amounts. The Na—CNC was obtained in a manner substantially the same as that described for Example 1. In this example, a first set of jars of aluminium and brass had 0 grams of Na—CNC and a second set of jars of aluminium and brass included 34 grams of Na—CNC added thereto. This corresponds to compositions having 0 and 6.8% of Na—CNC as a percentage by weight of the carrier. The results of the testing are set out in Table 2 below.

TABLE 2

| Aluminium and Brass Corrosion Rates (mpy) at 25° C. | | | | |
|---|---|---|---|---|
| Metal | Aluminum | | Brass | |
| Na—CNC (wt. %) | 0 | 6.8 | 0 | 6.8 |
| Corrosion rate (mpy) | 0.00 | 0.40 | 0.10 | 0.20 |

As seen from Table 2, for the aluminium coupons, it was found that the corrosion rate increased from 0.00 mpy to 0.40 mpy when the amount of Na—CNC within the jar was increased from 0 to 6.8 percent by weight of the carrier. For the brass coupons, the corrosion rate increased from 0.10 mpy to 0.20 mpy when the amount of Na—CNC within the jar was increased from 0 to 6.8 percent by weight of the carrier.

2. Free Form Cellulose Nanocrystals as a Corrosion Inhibitor for Metals 2.1 Ferrous Metals and Free Form Cellulose Nanocrystals In contrast, it has been discovered, surprisingly, that cellulose nanocrystals in free form, such as acid form cellulose nanocrystals, are particularly effective in inhibiting the corrosion of ferrous metals and may thus be used as a corrosion inhibitor. An exemplary set of results in this regard are shown in the Example 3 set out below.

Cellulose nanocrystals may be non-toxic, as shown in the "Nanocrystalline Cellulose Material Safety Data Sheet", prepared by FP Innovations on Oct. 31, 2011, and revised on Apr. 16, 2012. Cellulose nanocrystals arise from plant material such as wood, and may thus comprise a corrosion inhibitor that is environmentally friendly and biodegradable.

EXAMPLE 3

Corrosion rates were measured by immersing two sets of coupons of steel (carbon steel 4130) in typical seawater compositions. The loss of mass of the coupons due to corrosion was then measured after a set amount of days, in this example 34 days. One set of coupons was tested at an ambient temperature of approximately 25 degrees Celsius. The other set of coupons was tested within an enclosure at an elevated temperature of approximately 40 degrees Celsius. The coupons were kept within jars, with each jar having a lid with an aperture extending therethrough.

The masses of the coupons were determined before and after the 34 day period to an accuracy of $\pm 10^{-5}$ grams in a manner substantially identical to that set out in Example 1. Mils per year (mpy) rates were obtained thereby following the protocol outlined in the NACE International Corrosion Engineers Reference Book, $2^{nd}$ Edition, as set out on pages 78 and 79 therein. In this example, each of the jars contained a carrier in the form of water in the amount of 800 grams. Each of the jars also included 28.8 grams of sea salt. Each jar thus had sea salt in an amount of 3.6 percent by weight of the carrier, which may approximate the typical amount of salt in sea water.

Varying amounts of free form cellulose nanocrystals were added to the various jars to form a variety of compositions. In this example, the free form cellulose nanocrystals were in acid form. In this example, the composition of each jar in which cellulose nanocrystals were added included a compound of formula $R_1$—$R_2$ in which $R_1$ is a hydrogen atom and $R_2$ is a cellulose nanocrystal (CNC). Acid form cellulose nanocrystals may thus hereinafter be referred to as H—CNC.

The H—CNC was added in varying amounts to the various jars from a stock of 3% H—CNC in suspension in distilled water. The 3% H—CNC stock was obtained from dried Na—CNC as described above in Example 1. In order to obtain 3% H—CNC stock in suspension in distilled water, 3% of Na—CNC as a percentage by weight of water was added to two liters of distilled water. The mixture was then continuously stirred for a minimum of twelve hours in this example. The mixture was next sonicated for a minimum of ten minutes. Lastly, 300 microliters of 64% $H_2SO_4$ were added to the mixture until a pH of 3 was obtained.

The 3% H—CNC stock was added in various amounts to the jars so as to obtain 0, 0.8, 1.6, 4.0 and 8.0 grams of H—CNC in respective ones of the jars, which corresponds to 0, 0.1, 0.2, 0.5 and 1.0% of H—CNC as a percentage by weight of the water. The results of the testing are set out in Table 3 below and graph seen in FIG. 1.

TABLE 3

Steel Coupon Weight Loss in mils per year (mpy)

| Temperature | H—CNC (wt. %) | | | | |
|---|---|---|---|---|---|
| | 0 | 0.1 | 0.2 | 0.5 | 1 |
| 25° C. | 1.60 | 1.47 | 0.61 | 0.35 | 0.33 |
| 40° C. | 2.18 | 1.82 | 1.25 | 0.49 | 0.53 |

As can be seen, the results demonstrate that the corrosion rate of ferrous metals, in this example steel, decreases as the percentage of H—CNC within the various compositions of the jars increases from 0 to 1 percent by weight of the carrier. For the coupons at a temperature of 25 degrees Celsius, the corrosion rate decreases from 1.60 to 0.33 in mils per year (mpy) in an at least partially inverse manner as the amount of H—CNC increases from 0 to 1.0 percent by weight of the carrier. For the coupons at a temperature of 40 degrees Celsius, the corrosion rate decreases from 2.18 to 0.53 in mils per year (mpy) in an at least partially inverse manner as the amount of H—CNC increases from 0 to 1.0 percent by weight of the carrier. According to one aspect, the effective amount of H—CNC in the composition is thus preferably equal to up to at least 1 percent by weight of the carrier.

The results show that the corrosion rate of the coupons significantly decreases or dips within an amount of H—CNC of 0 and 0.5 percent by weight of the carrier: for the coupons at 25 degrees Celsius, the corrosion rate decreased from 1.60 to 0.35 mpy; for the coupons at 40 degrees Celsius, the corrosion rate decreased from 2.18 to 0.49 mpy. The amount of corrosion appears to generally level off as more H—CNC is added thereafter.

The results show that the steepest decrease in corrosion rate occurred when the amount of H—CNC increased from 0.1 to 0.2 percent by weight of the carrier: for the coupons at 25 degrees, the corrosion rate decreased from 1.47 to 0.61 mpy; and for the coupons at 40 degrees, the corrosion rate decreased from 1.82 to 1.25 mpy. According to another aspect, the H—CNC is thus preferably included in an amount substantially equal to at least 0.1 percent by weight of the carrier.

The results also demonstrate that the effective amount of H—CNC in the composition needed by weight of the carrier increases as the temperature of the environment within which the composition is to be used increases.

For the coupons at 25 degrees Celsius, the rate of corrosion appears to decrease in a more gradual manner as the amount of H—CNC increases by more than 0.2 percent by weight of the carrier. The rate of corrosion decreases in an even more gradual manner at an amount of H—CNC of 0.3 percent or more by weight of the carrier. The rate of corrosion appears to substantially level off when the amount of H—CNC is added to an amount of 0.5 to 1.0 percent by weight of the carrier: the corrosion rate decreases from 0.35 to 0.33 mpy in this regard. This trend points to the conclusion that effective corrosion inhibition continues to occur when H—CNC is added to sea-salt solutions in amounts greater than 1.0 percent by weight of the carrier.

For the coupons at 40 degrees Celsius, the rate of corrosion appears to generally level off at an amount of H—CNC of about 0.5 percent by weight of the carrier. For the coupons at 40 degrees Celsius, the rate of corrosion may increase slightly at an amount of H—CNC of 0.7 percent by weight of the carrier from a corrosion rate of about 0.48 to 0.53 mpy at an amount of H—CNC of 1.0 percent by weight of the carrier. According to a further preferred aspect, the amount of H—CNC in the composition may thus be equal to 0.2 to 0.7 percent by weight of the carrier.

The corrosion rate for the coupons at 40 degrees Celsius appears to be at its lowest at an amount of H—CNC of about 0.6 percent by weight of the carrier, which also corresponds to a low corrosion rate for the coupons at 25 degrees Celsius: the corrosion rate of the coupon at 40 degrees Celsius would appear to equal to about 0.40 mpy and the corrosion rate of the coupon at 25 degrees Celsius would appear to equal to about 0.33 mpy. According to a yet further preferred aspect, the amount of cellulose nanocrystals in the composition may thus generally be equal to 0.6 percent by weight of the carrier.

2.2 Non-Ferrous Metals and Free form Cellulose Nanocrystals

According to a further aspect, it has been discovered that cellulose nanocrystals in free form, such as acid form cellulose nanocrystals, are effective in inhibiting the corrosion of non-ferrous metals. A plurality of cellulose nanocrystals in free or acid form may thus function alone as a corrosion inhibitor for inhibiting ferrous and non-ferrous metals. Cellulose nanocrystals may thus be used as an anti-corrosion agent for metals generally. There may accordingly be provided a corrosion-inhibiting composition essentially consisting of a plurality of cellulose nanocrystals in free or acid form.

An exemplary set of results in this regard are shown in the Example 4 set out below.

EXAMPLE 4

Corrosion rates were obtained by immersing coupons of aluminium (aluminium 2024-T3) and brass (UNS C27000 Yellow Brass) in typical seawater compositions. The coupons were then removed from the compositions and the loss of mass of the coupons due to corrosion was measured after a set amount of days, in this example 34 days. The coupons were tested within an enclosure at an elevated temperature of approximately 40 degrees Celsius and were kept within jars. Each jar had a lid with an aperture extending therethrough. The masses of the coupons were determined before and after the 34 day period to an accuracy of $\pm 10^{-5}$ grams in a manner substantially similar to that describe within Example 1. Mils per year (mpy) rates were obtained thereby following the protocol outlined in the NACE International Corrosion Engineers Reference Book, $2^{nd}$ Edition, as set out on pages 78 and 79 therein.

Each of the jars contained a carrier, in this example in the form of water in the amount of 800 grams. Each jar included 28.8 grams of sea salt, which is salt in the amount of 3.6 percent by weight of the water, thus approximating typical sea water conditions. 3% H—CNC stock was obtained in a substantially similar manner as that described for Example 3. 3% H—CNC stock was added to the selective ones of the jars so as to obtain two sets of jars, where each set of jars included a jar having 0 grams of H—CNC and a jar having 4.0 grams of H—CNC. These amounts of H—CNC correspond to 0 and 0.5% of H—CNC as a percentage by weight of the water. The results of the testing are set out in Table 4 below.

TABLE 4

| Aluminum and Brass Corrosion Rates at 40° C. (mpy) | | | | |
|---|---|---|---|---|
| Metal | Aluminum | | Brass | |
| H—CNC (wt. %) | 0 | 0.5 | 0 | 0.5 |
| Corrosion rate (mpy) | 0.43 | 0.12 | 0.15 | 0.26 |

As seen above, the corrosion rate for the aluminium coupons was found to decrease from 0.43 mpy to 0.12 mpy when the amount of H—CNC was increased from 0 to 0.5 percent by weight of the carrier. Similar to the effects discovered for ferrous metals, these results thus point to the conclusion that H—CNC added in an effective amount in the order 0 to 1.0 percent of H—CNC per weight of the carrier may also function to inhibit corrosion of non-ferrous metals such as aluminium-based metals.

The corrosion rate for the brass coupons was found to slightly increase from 0.15 mpy to 0.26 mpy when the amount of H—CNC was increased from 0 to 0.5 percent by weight of the carrier. However, the demonstrated effects of H—CNC as a corrosion inhibitor for decreasing the corrosion rates of steel and aluminium would lead someone skilled in the art to reasonably infer that H—CNC in an effect amount would also inhibit the corrosion of copper-based metals, such as brass.

3. Free Form Cellulose Nanocrystals as an Agent for Corrosion Inhibitors

3.1 Ferrous Metals, Free Form Cellulose Nanocrystals and Corrosion Inhibitors According to another aspect, it has been discovered that cellulose nanocrystals in free form, such as acid form cellulose nanocrystals, are particularly effective in combination with known corrosion inhibitors for inhibiting the corrosion of ferrous metals.

It has also been discovered that synergistic effects occur when combining free form cellulose nanocrystals with a further corrosion inhibitor, such as a known, off-the-shelf corrosion inhibitor. This is demonstrated in Example 5 with coupon jar test results from an exemplary series of corrosion inhibitors.

It has been further discovered, as demonstrated by the below results, that free form cellulose nanocrystals in combination with a further inhibitor inhibit corrosion of ferrous metals where the amount of free form cellulose nanocrystals is equal to up to at least one percent by weight of the carrier. According to a further preferred aspect, it has been yet further discovered that free form cellulose nanocrystals in combination with the further inhibitor inhibit corrosion of ferrous metals where the amount of acid form cellulose nanocrystals is equal to up 0.7 percent by weight of the carrier.

An exemplary set of results in this regard are shown in Examples 5 and 6 set out below.

EXAMPLE 5

Corrosion rates were measured by immersing various coupons of steel (carbon steel 4130) in typical seawater compositions. The coupons were then removed from the compositions and the loss of mass of the coupons due to corrosion was measured after a set amount of days. The coupons were tested at an ambient temperature of approximately 25 degrees Celsius. The coupons were kept within jars, with each jar having a lid with an aperture extending therethrough. The masses of the coupons were determined before and after the set testing period to an accuracy of $\pm 10^{-5}$ grams in a manner substantially similar to that describe in Example 1. Mils per year (mpy) rates were obtained thereby following the protocol outlined in the NACE International Corrosion Engineers Reference Book, $2^{nd}$ Edition, as set out on pages 78 and 79 therein.

Each of the jars contained a carrier, in this example in the form of water in the amount of 800 grams, and included 28.8 grams of sea salt. This equals to an amount of salt of 3.6 percent by weight of the water, approximating typical sea water conditions. 3% H—CNC stock was obtained in a substantially similar manner as that described for Example 3. The 3% H—CNC stock was added in various amounts to thirteen sets of five jars so as to obtain, for each set of jars, jars containing 0, 0.8, 1.6, 4.0 and 8.0 grams of H—CNC, respectively. This corresponds to jars having H—CNC in amounts of 0, 0.1, 0.2, 0.5 and 1.0 percent by weight of the carrier.

Various off-the-shelf corrosion inhibitors were then added in varying amounts to selective ones of the jars, as shown by exemplary ones of the tested corrosion inhibitors set out in Table 5 below. In this case, the listed corrosion inhibitors include: a common azole, in this example benzotriazole (BTA); ammonium benzoate; a proprietary corrosion inhibitor by the name of VpCl 644; and sodium benzoate. This list of corrosion inhibitors is set out by way of example only, and other corrosion inhibitors may similarly be used to demonstrate the effects set out below.

Coupons were placed in jars containing BTA, ammonium benzoate, and H—CNC alone for 34 days in this example, and coupons were placed in jars containing VpCl 644 and sodium benzoate for 31 days. The protocol outlined in the NACE International Corrosion Engineers Reference Book factors in variations in testing times when determining mils per year (mpy) rates of corrosion. BTA is a widely-used corrosion inhibitor for metals that include copper, brass, and bronze. BTA may also be used as a corrosion inhibitor for cleaners, coatings, detergents, water-treatment and food contact metallic articles, for example. BTA has a CAS number of CAS 95-14-7 and may be purchased, for example, at Wuhan Golden Wing Industry and Trade Co. Ltd., which has an address of Room 1101, Building 2-2, DaJiang, JiangDa Road, JiangAn District, Wuhan, China. However, BTA is a well-known inhibitor that may be readily obtained from a variety of chemical supply companies, as would be appreciated by one skilled in the art.

Ammonium benzoate is an example of an aqueous, biodegradable corrosion inhibitor for ferrous metals or aluminium of the type that may be adapted for oil and gas industry applications, for example. It has a CAS number of CAS 1863-63-4. Ammonium benzoate is an off-the-shelf product that may be readily obtained from a variety of chemical supply companies, as would be appreciated by one skilled in the art.

VpCl 644 is a proprietary corrosion inhibitor of the type adapted for ferrous and non-ferrous metals in salt or brine water environments. VpCl 644 may be purchased at Cortec Corporation, which has an address of 4119 White Bear Parkway, St. Paul, Minn. 55110, United States of America.

Sodium benzoate is used as a corrosion inhibitor that may be used for anti-freeze, coolants, emulsion paints, cutting oils, and metals in impregnated paper, for example. It has a CAS number of CAS 532-32-1 and it is an off-the-shelf product that may be readily obtained from a variety of chemical supply companies, as would be appreciated by one skilled in the art.

0.8 grams of BTA was added to a first set of five jars containing 0, 0.1, 0.2, 0.5 and 1.0% of H—CNC as a percentage by weight of the water, respectively. 1.6 grams of BTA was added to a second set of five jars containing 0, 0.1, 0.2, 0.5 and 1.0% of H—CNC as a percentage by weight of the water, respectively. 4.0 grams of BTA was added to a third set of jars containing 0, 0.1, 0.2, 0.5 and 1.0% of H—CNC as a percentage by weight of the water, respectively. These three sets of jars thus contained BTA in the amount of 0.1, 0.2 and 0.5 percent by weight of the water, respectively.

In a substantially similar manner as described above, 0.8 grams, 1.6 grams and 4.0 grams of ammonium benzoate were added to a further three sets of five jars, with each set containing jars of 0, 0.1, 0.2, 0.5 and 1.0% of H—CNC as a percentage by weight of the water. These sets of jars thus contained ammonium benzoate in the amount of 0.1, 0.2 and 0.5 percent by weight of the water, respectively.

In a further substantially similar manner as described above, 0.8 grams, 1.6 grams and 4.0 grams of VpCl 644 were added to another three sets of five jars, with each set containing jars of 0, 0.1, 0.2, 0.5 and 1.0% of H—CNC as a percentage by weight of the water. These sets of jars thus contained VpCl 644 in the amount of 0.1, 0.2 and 0.5 percent by weight of the water, respectively.

In yet another substantially similar manner as described above, 0.8 grams, 1.6 grams and 4.0 grams of sodium benzoate were added to the remaining three sets of five jars, with each set containing jars of 0, 0.1, 0.2, 0.5 and 1.0% of H—CNC as a percentage by weight of the water. These remaining sets of jars thus contained sodium benzoate in the amount of 0.1, 0.2 and 0.5 percent by weight of the water, respectively.

Each of the above described compositions were stirred together and then set aside for a minimum of twenty-four hours before the testing began by suspending the steel coupons in the jars.

The results of the testing are set out in Table 5 below and via the graphs seen in FIGS. 2 to 5.

TABLE 5

Steel Corrosion Rate at 25° C. (mpy)

| | H—CNC (wt. %) | | | | |
|---|---|---|---|---|---|
| Additional Inhibitor | 0 | 0.1 | 0.2 | 0.5 | 1 |
| None | 1.60 | 1.47 | 0.61 | 0.35 | 0.33 |
| BTA 0.1% | 0.70 | 0.65 | 0.35 | 0.24 | 0.22 |
| BTA 0.2% | 0.46 | 0.36 | 0.00 | 0.02 | 0.19 |
| BTA 0.5% | 0.23 | 0.37 | 0.28 | 0.02 | 0.20 |
| Ammonium Benzoate 0.1% | 1.77 | 0.58 | 0.57 | 0.44 | 0.67 |
| Ammonium Benzoate 0.2% | 2.04 | 0.45 | 0.72 | 0.44 | 0.83 |
| Ammonium Benzoate 0.5% | 2.06 | 1.08 | 1.29 | 0.70 | 0.71 |
| VpCl 644 0.1% | 1.56 | 1.20 | 1.06 | 0.35 | 0.30 |
| VpCl 644 0.2% | 1.51 | 1.20 | 0.92 | 0.41 | 0.38 |
| VpCl 644 0.5% | 1.34 | 1.25 | 1.10 | 0.35 | 0.00 |
| Sodium Benzoate 0.1% | 1.61 | 1.56 | 1.36 | 0.42 | 0.46 |
| Sodium Benzoate 0.2% | 1.64 | 1.64 | 1.61 | 0.45 | 0.50 |
| Sodium Benzoate 0.5% | 1.62 | 1.59 | 1.39 | 0.32 | 0.57 |

3.1.1 Ferrous Metals, Free Form Cellulose Nanocrystals and Azole (BTA)

Figure 2:
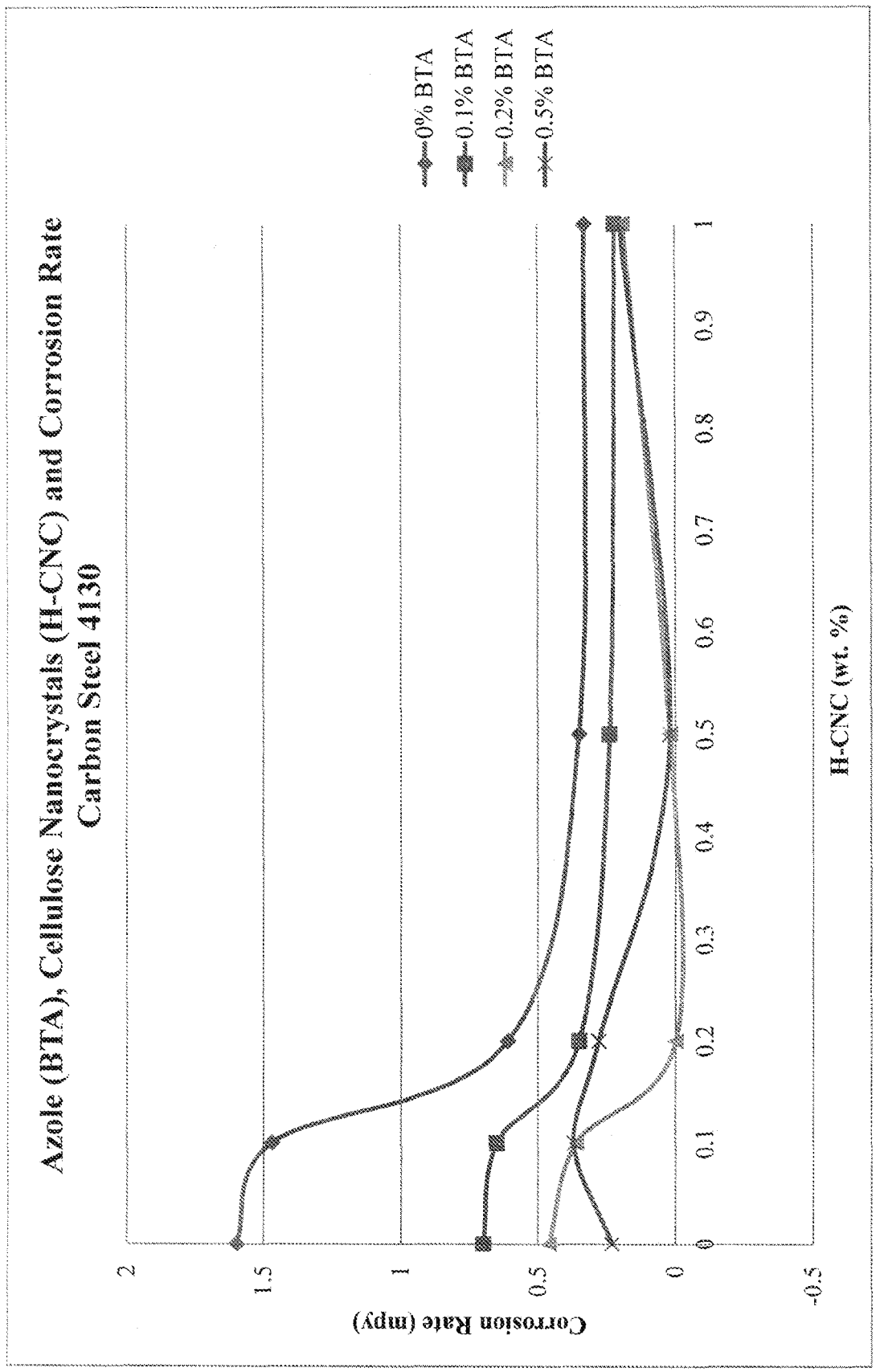
FIG. 2 is a line graph showing the results of another coupon jar test similar to FIG. 1 in which various amounts of azole (BTA) and H—CNC were added to the jars, where corrosion rate in mils per year (mpy) is shown as a function of varying amounts of BTA and H—CNC.

As seen in Table 5 and the graph of FIG. 2, the results demonstrate that the corrosion rate of the steel for the most part decreases for compositions which include an azole compound, in this example BTA, as the percentage of H—CNC within the various compositions of the jars increases from an amount of 0 to 1.0 percent by weight of the carrier. According to one aspect, the results demonstrate that the effective amount of H—CNC in the composition is thus preferably up to at least 1 percent by weight of the carrier for an azole. This conclusion is supported for the range of BTA of up to 0.5 percent by weight of the carrier. The results suggest that this effect would continue for where the azole is included in an amount greater than 0.5 percent by weight of the carrier.

The only exceptional data point appears to be where the corrosion rate increased from 0.23 to 0.37 mpy when the BTA was in an amount of 0.5 percent by weight of the carrier and the H—CNC increased in an amount of 0 to 0.1 percent by weight of the carrier. The data thus supports the conclusion that corrosion is inhibited in cases where the BTA is in an amount of 0 to 0.5 percent by weight of the carrier and the cellulose nanocrystals are in free form and included in an amount greater than 0.2 percent by weight of the carrier.

The results show that the corrosion rate of the coupons significantly decreases or dips for each of the compositions within an amount of H—CNC in the range of 0 and 0.5 percent by weight of the carrier. For the compositions in which the BTA was in an amount of 0.1 percent by weight of the carrier, the corrosion rate decreases from 0.70 to 0.24 mpy as the amount of H—CNC increased from 0 to 0.5 percent by weight of the carrier. For the compositions in which the BTA was in an amount of 0.2 percent by weight of the carrier, the corrosion rate decreased from 0.46 to 0.02 mpy as the amount of H—CNC increased from 0 to 0.5 percent by weight of the carrier. For the compositions in which the BTA was in an amount of 0.5 percent by weight of the carrier, the corrosion rate decreased from 0.23 to 0.02 mpy as the amount of H—CNC increased from 0 to 0.5 percent by weight of the carrier. For the compositions in which no BTA was added, the corrosion rate decreased from 1.60 to 0.35 mpy when the amount of H—CNC increased from 0 to 0.5 percent by weight of the carrier.

These and other results from Table 5 and the graph of FIG. 2 demonstrate that, surprisingly, a synergistic effect is occurring between H—CNC and the azole corrosion inhibitor, in which the corrosion rate for a composition comprising both a given amount of H—CNC and a given amount of the BTA is typically less than any one of the individual corrosion rates that would occur from the given amounts of H—CNC and BTA, respectively, on their own.

In particular, as seen by the graph in FIG. 2, a synergistic effect occurs for compositions in which the amount of BTA is at least 0.2 or less percent by weight of the carrier and H—CNC is added to an amount of up to at least 1.0 percent by weight of the carrier. Also as seen by the graph in FIG. 2, a synergistic effect occurs for compositions in which the amount of BTA is up to 0.5 percent by weight of the carrier and H—CNC is added to an amount of between 0.25 and 1.0 percent by weight of the carrier.

The results show that a significant lowering in corrosion rate occurred for the compositions having BTA in amounts of up to 0.2, likely more than 0.2 and less than 0.5 percent by weight carrier, when the amount of H—CNC increased from 0.1 to 0.2 percent by weight of the carrier: for the compositions having BTA in an amount of 0.1 percent by weight of carrier, the corrosion rate decreases from 0.65 to 0.35 mpy; and for the compositions having BTA in an amount of 0.2 percent by weight of carrier, the corrosion rate decreases from 0.36 to 0.00 mpy. For the compositions having BTA in an amount of 0.5 percent by weight of carrier, the steepest decline in corrosion rate occurred when the amount of H—CNC was increased from 0.2 to 0.5 percent by weight of the carrier: the corrosion rate decreased from 0.28 to 0.02 mpy.

The amount of corrosion appears to generally level off as more H—CNC is added past an amount of 0.5 percent by weight of the carrier for the compositions containing BTA in an amount of 0.1 percent by weight of the carrier. The amount of corrosion of the steel appears to slightly increase as more H—CNC is added past an amount of 0.5 percent by weight of the carrier for the compositions containing BTA in amounts more than 0.1 percent by weight of the carrier. For example, for composition containing BTA in an amount of 0.2 percent by weight of the carrier, the corrosion rates were found to increase from 0.02 to 0.19 mpy as the amount of H—CNC was increased from 0.5 to 1.0 percent of weight of the carrier. Similarly, for composition containing BTA in an amount of 0.5 percent by weight of the carrier, the corrosion rates were found to increase from 0.02 to 0.20 mpy as the amount of H—CNC was increased from 0.5 to 1.0 percent of weight of the carrier. Thus, according to one preferred range, a corrosion-inhibiting composition may comprise free form cellulose nanocrystals in an amount generally equal to 0.1 to 0.6 percent by weight of the carrier and azole in an amount that is less than 0.5 percent by weight of the carrier.

Each of the BTA compositions has relatively low corrosion rates when the amount of H—CNC is generally equal to 0.5 percent by weight of the carrier: the corrosion rate was 0.24 mpy for the composition having BTA in an amount of 0.1 percent by weight of the carrier composition; the corrosion rate was 0.02 for the composition having BTA in an amount of 0.2 percent by weight of the carrier composition; and the corrosion rate was 0.02 for the composition having BTA in an amount of 0.5 percent by weight of the carrier composition. Thus, according to one preferred aspect, a corrosion-inhibiting composition may comprise azole and H—CNC in an amount generally equal to 0.5 percent by weight of the carrier. The above data demonstrates that the corrosion rate lowers in this context as the amount of BTA is increased. The data therefore points to the conclusion that a low corrosion rate will continue to be achieved for corrosion-inhibiting compositions comprising azole in amounts ranging from 0 to well above 0.5 percent of the weight of the carrier and H—CNC in an amount equal to about 0.5 percent by weight of the carrier.

The corrosion rates for compositions having BTA generally in the amount of 0.2 percent by weight of the carrier were discovered to be particularly low when the amount of H—CNC was generally in the range of 0.2 to 0.5 percent by weight of the carrier: the corrosion rate was 0.00 mpy when the amount of H—CNC was 0.2 percent by weight of the carrier as seen in the graph of FIG. 2; and the corrosion rate was 0.02 mpy when the amount of H—CNC was 0.5 percent by weight of the carrier. Thus, according to one aspect, a corrosion-inhibiting composition may comprise H—CNC included in an amount generally in the range of 0.2 to 0.5 percent by weight of the carrier and azole included in an amount generally equal to 0.2 percent by weight of the carrier.

The corrosion rate for compositions having BTA in an amount of 0.1 percent by weight of the carrier were discovered to generally level off when the amount of H—CNC in the composition was in the range of 0.2 to 1.0 percent by weight of the carrier: the corrosion rate decreases from 0.35 mpy at an amount of H—CNC of 0.2 percent by weight of the carrier, to 0.24 mpy at an amount of H—CNC of 0.5 percent by weight of the carrier, and 0.22 mpy at an amount of H—CNC of 1.0 percent by weight of the carrier.

As mentioned above, the corrosion rate of the composition having BTA in the amount of 0.2 percent by weight of the carrier appears to increase past an amount of H—CNC of 0.5 percent by weight of the carrier. However, when the amount of H—CNC is at 1.0 percent by weight of the carrier, the corrosion rate was still found to be only 0.19 mpy for composition having BTA in the amount of 0.2 percent by weight of the carrier. Thus, according to another aspect, the H—CNC is preferably included in the range of 0.2 to 1.0 percent by weight of the carrier when the amount of azole is included in an amount generally equal to up to 0.2 percent by weight of the carrier.

3.1.2 Ferrous Metals, Free Form Cellulose Nanocrystals and Ammonium Benzoate

Figure 3:
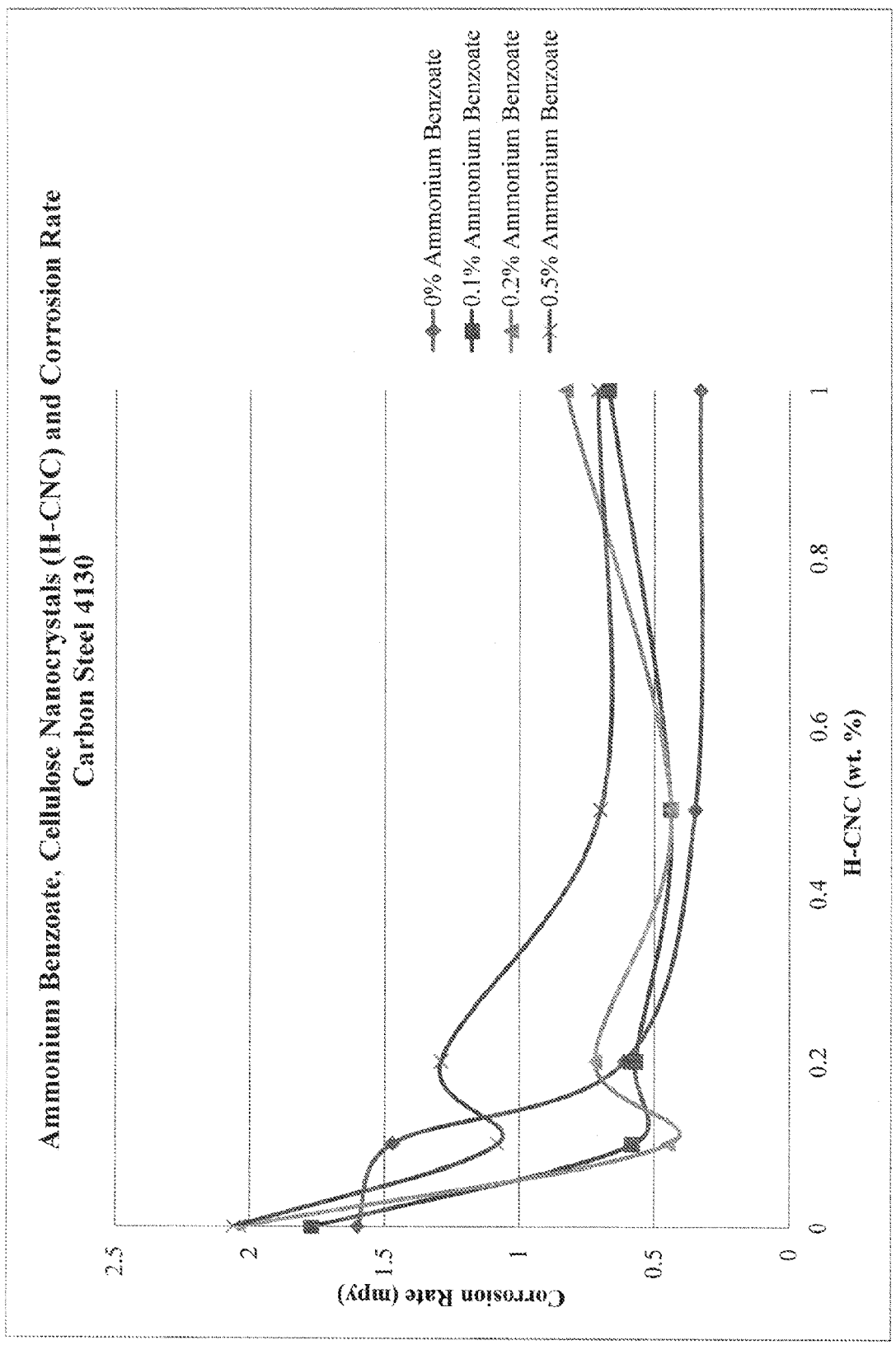
FIG. 3 is a line graph showing the results of a further coupon jar test similar to FIG. 2 in which various amounts of ammonium benzoate and H—CNC were added to the jars, where corrosion rate in mils per year (mpy) is shown as a function of varying amounts of ammonium benzoate and H—CNC.

As seen in Table 5 and the graph of FIG. 3, the results demonstrate that the corrosion rate of the steel generally decreases for compositions including ammonium benzoate, as the percentage of H—CNC within the various compositions of the jars increases from an amount of 0 to 1.0 percent by weight of the carrier. According to one aspect, the results demonstrate that the effective amount of H—CNC in the composition is thus preferably up to at least 1 percent by weight of the carrier for ammonium benzoate. This conclusion is supported for the range of ammonium benzoate of up to 0.5 percent by weight of the carrier. The results suggest that this effect may continue for situations in which the ammonium benzoate is included in amounts greater than 0.5 percent by weight of the carrier.

The results and graph of FIG. 3 demonstrate that the corrosion rate of the coupons significantly dips for each of the compositions having an amount of H—CNC of 0.00 and 0.12 percent by weight of the carrier: for the compositions in which the ammonium benzoate was in an amount of 0.1 percent by weight of the carrier, the corrosion rate decreased from 1.77 to about 0.52 mpy; for the compositions in which the ammonium benzoate was in an amount of 0.2 percent by weight of the carrier, the corrosion rate decreased from 2.04 to about 0.39 mpy; and for the compositions in which the ammonium benzoate was in an amount of 0.5 percent by weight of the carrier, the corrosion rate decreased from 2.06 to about 1.05 mpy.

Thus, according to another aspect, a corrosion-inhibiting composition may comprise H—CNC included in an amount generally equal to at least 0.1 percent by weight of the carrier in a combination with an amount of ammonium benzoate in the range 0 to at least 0.5 percent by weight of the carrier.

For the compositions in which no ammonium benzoate was added, the corrosion rate decreased from 1.60 to 0.35 mpy when the amount of H—CNC increased from 0 to 0.1 percent by weight of the carrier. These data points thus demonstrate that, surprisingly, a synergistic effect is occurring in some instances between H—CNC and the ammonium benzoate: the corrosion rate for a composition comprising both a given amount an amount of H—CNC, in this example an amount of H—CNC of 0.1 percent by weight of the carrier, and a given amount of the ammonium benzoate, in this example an amount of ammonium benzoate of up to 0.5 percent by weight of the carrier, is less than any one of the individual corrosion rates that would occur from the given amounts of H—CNC and ammonium benzoate, respectively, on their own.

As seen in FIG. 3, the corrosion rates of the steel coupons appear to then slightly increase when the amount of H—CNC is increased to 0.2 percent by weight of the carrier. A bump-like pattern thus results. In this case, the corrosion rates are 0.57, 0.72 and 1.29 mpy for the compositions having ammonium benzoate in amounts of 0.1, 0.2 and 0.5 percent by weight of the carrier, respectively.

The corrosion rates thereafter appear to again decrease or slightly dip thereafter to lower rates approximately corresponding to when the amount of H—CNC in the respective compositions is equal to about 0.5 percent by weight of the carrier. In this case, the corrosion rates lower from 0.57, 0.72 and 1.29 mpy to 0.44, 0.44 and 0.70 mpy for the compositions having ammonium benzoate in amounts of 0.1, 0.2 and 0.5 percent by weight of the carrier, respectively, when the amount of H—CNC in the composition increases from 0.2 to 0.5 percent by weight of the carrier. The exception to the above is the composition having ammonium benzoate in an amount of 0.5 percent by weight of the carrier: such compositions appear to provide a lower point of corrosion rate of 0.65 mpy when the amount of H—CNC is equal to about 0.6 percent by weight of the carrier.

Past these lower points of corrosion, the corrosion rate of the coupons appears to generally increase once more to 0.67, 0.83 and 0.71 mpy for the compositions having ammonium benzoate in amounts of 0.1, 0.2 and 0.5 percent by weight of the carrier, respectively, when the amount of H—CNC in the composition increases to 1.0 percent by weight of the carrier.

Thus, in view of the above and according to yet another aspect, a corrosion-inhibiting composition may comprise H—CNC in an amount generally equal to 0.1 to 0.6 percent by weight of the carrier and ammonium benzoate in an amount generally equal to up at least 0.5 percent of weight of the carrier. According to a more preferred range, the H—CNC in the composition may be in an amount of generally equal to 0.3 to 0.6 percent by weight of the carrier.

3.1.3 Ferrous Metals, Free Form Cellulose Nanocrystals and VpCl 644

Figure 4:
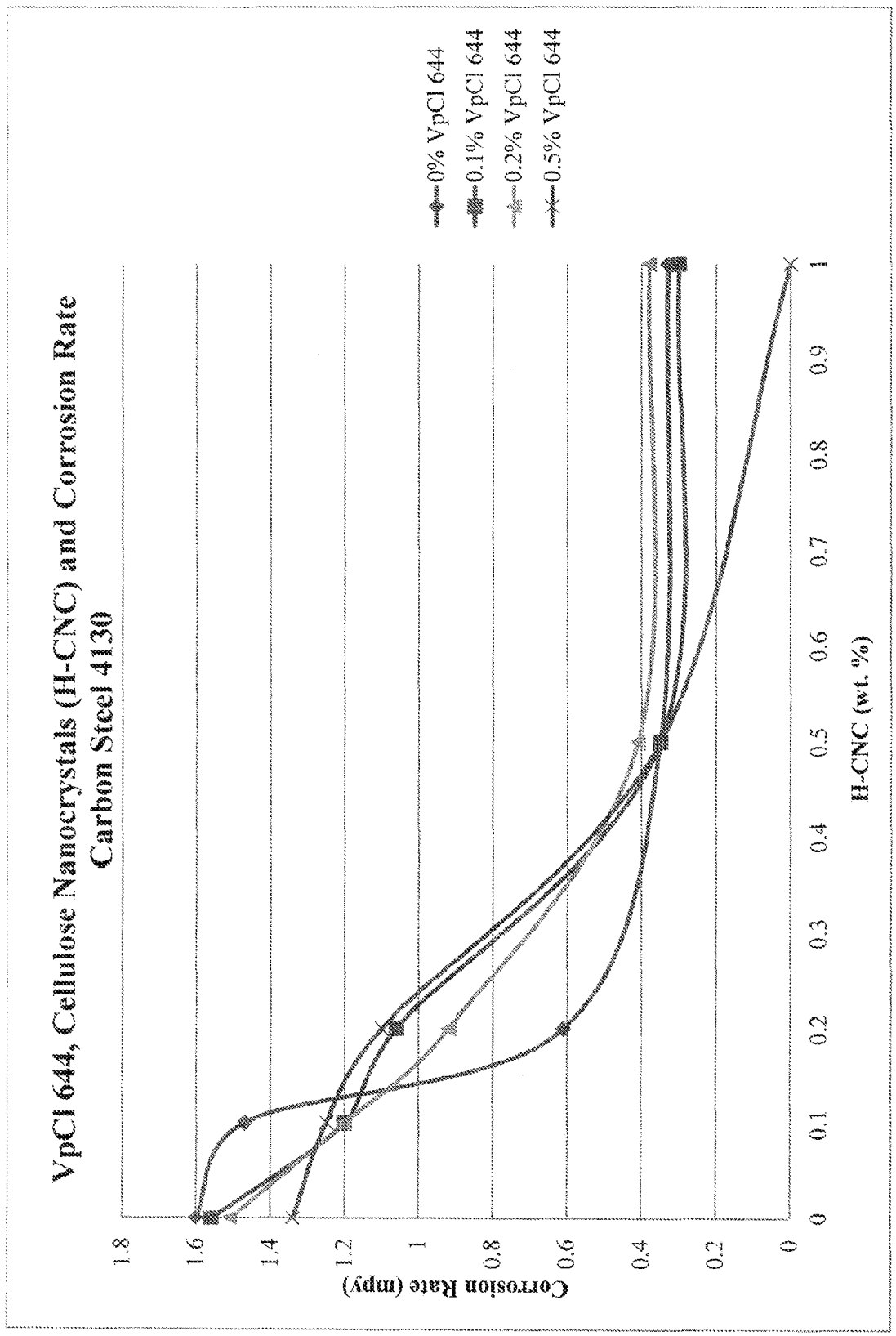
FIG. 4 is a line graph showing the results of yet further coupon jar test similar to FIG. 2 in which various amounts of VpCl 644 (a proprietary corrosion inhibitor) and H—CNC were added to the jars, where corrosion rate in mils per year (mpy) is shown as a function of varying amounts of VpCl 644 and H—CNC.

As seen in Table 5 and the graph of FIG. 4, the results demonstrate that the corrosion rate of steel decreases for compositions including the proprietary corrosion inhibitor VpCl 644, as the percentage of H—CNC within the various compositions of the jars increases from an amount of 0 to 1.0 percent by weight of the carrier. According to one aspect, the results demonstrate that the effective amount of H—CNC in the composition is thus preferably up to at least 1 percent by weight of the carrier for VpCl 644. This conclusion is supported for the range of VpCl 644 of up to 0.5 percent by weight of the carrier. The results suggest that this effect may continue for situations in which the VpCl 644 is included in amounts greater than 0.5 percent by weight of the carrier because the corrosion rate was found to continuously lower to 0.00 mpy when the amount of VpCl 644 was increased to 0.5 percent by weight of the carrier and the amount of H—CNC was increased to 1.0 percent by weight of the carrier. Similarly, the results suggest that this effect may continue for situations in which the amount of H—CNC is equal to well greater than 1.0 percent by weight of the carrier, because the corrosion rate trends of the graph shown in FIG. 4 up to this amount of H—CNC were generally level and/or decreasing as the amount of H—CNC was increased.

The data also demonstrates synergistic effects when the H—CNC was combined in an effective amount with VpCl 644. for example, H—CNC when alone added to the compositions in amounts increasing from 0.5 to 1.0 percent by weight of the carrier resulted in corrosion rates of 0.35 mpy to 0.33 mpy; VpCl 644 when alone added in an amount of 0.5 percent by weight of the carrier resulted in a corrosion rate of 1.34 mpy; and, surprisingly, when both H—CNC and VpCl 644 were added to the sea-salt solution, the corrosion rate was found to lower from 0.35 to 0.00 mpy as the amount of H—CNC increased from 0.5 to 1.0 percent by weight of the carrier.

The results and the graph of FIG. 4 demonstrate that a further synergistic effect for compositions comprising a slight amount of H—CNC combined with an effective amount of VpCl 644. In this example, where the H—CNC was added in an amount of about 0.1 or less percent by weight of the carrier: the corrosion rate was 1.47 mpy for the composition having H—CNC alone in the amount of 0.1 percent by weight of the carrier; the corrosion rates were 1.56, 1.51 and 1.34 mpy for the compositions having VpCl 644 alone in amounts of 0.1, 0.2 and 0.5 percent by weight of the carrier, respectively; and the corrosion rates surprisingly lowered to 1.20, 1.20 and 1.25 mpy for the compositions having both H—CNC in an amount of 0.1 percent by weight of the carrier and VpCl 644 in amounts of 0.1, 0.2 and 0.5 percent by weight of the carrier, respectively.

The results and graph of FIG. 4 also demonstrate that the corrosion rate of the steel coupons dips for each of the compositions comprising H—CNC in an amount of 0 to 0.5 percent by weight of the carrier: for the compositions in which the VpCl 644 was in an amount generally equal to 0.1 percent by weight of the carrier, the corrosion rate decreased from 1.56 to about 0.35 mpy; for the compositions in which the VpCl 644 was in an amount generally equal to 0.2 percent by weight of the carrier, the corrosion rate decreased from 1.51 to about 0.41 mpy; and for the compositions in which the VpCl 644 was in an amount generally equal to 0.5 percent by weight of the carrier, the corrosion rate decreased from 1.34 to about 0.35 mpy. The corrosion rates of the compositions tested generally level off as the amount of H—CNC is increased thereafter, with the exception of the composition comprising an amount of VpCl 644 generally equal to 0.5 percent by weight of the carrier, which continues to dip, as mentioned above.

In summary, according to yet another aspect, a corrosion-inhibiting composition may comprise H—CNC in an amount generally within the range of 0 to at least 1.0 percent by weight of the carrier and a corrosion inhibitor in the form of VpCl 644 in an amount in the range of up to at least 0.5 percent of the weight of the carrier. According to a further preferred range, the H—CNC is generally included in an amount of 0.5 to 1.0 percent by weight of the carrier when combined with the corrosion inhibitor VpCl 644 in an amount in the range of up to at least 0.5 percent of the weight of the carrier.

3.1.4 Ferrous Metals, Free Form Cellulose Nanocrystals and Sodium Benzoate

Figure 5:
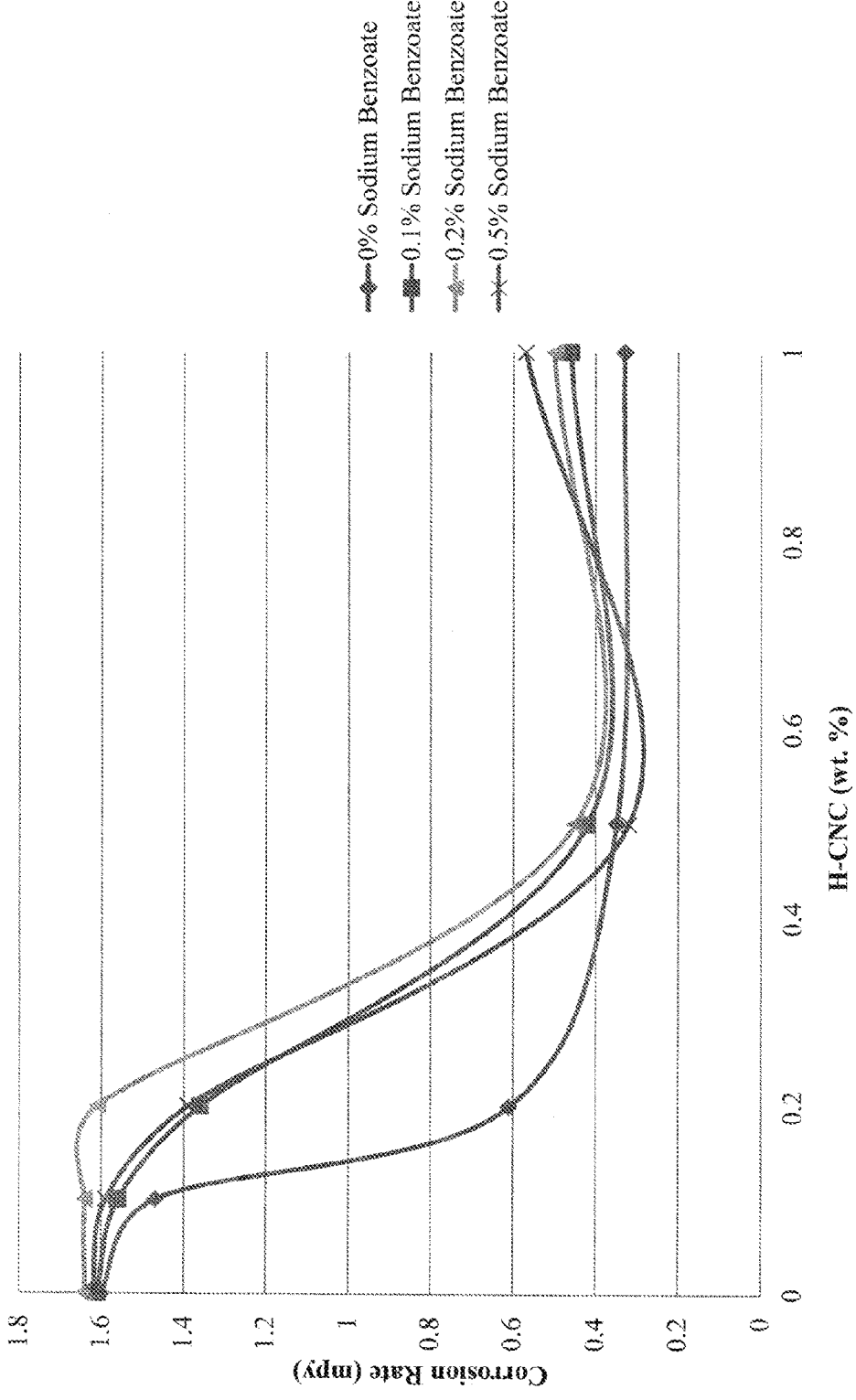
FIG. 5 is a line graph showing the results of another coupon jar test similar to FIG. 2 in which various amounts of sodium benzoate and H—CNC were added to the jars, where corrosion rate in mils per year (mpy) is shown as a function of varying amounts of sodium benzoate and H—CNC.

As seen in Table 5 and the graph of FIG. 5, the results demonstrate that the corrosion rate of the steel coupons generally decreases for compositions including sodium benzoate, as the percentage of H—CNC within the various compositions of the jars increases from an amount of 0 to 1.0 percent by weight of the carrier. According to one aspect, the results demonstrate that the effective amount of H—CNC in the composition is thus preferably up to at least 1 percent by weight of the carrier for sodium benzoate. This conclusion is supported for the range of sodium benzoate of up to 0.5 percent by weight of the carrier. The results suggest that this effect may continue for situations in which the sodium benzoate is included in an amount that is greater than 0.5 percent by weight of the carrier. Thus, according to an even further aspect, the H—CNC may be included in an amount generally equal to up to at least 1.0 percent by weight of the carrier in combination with sodium benzoate in an amount equal to at least 0.5 percent by weight of the carrier.

According to a further preferred aspect, the results and graph of FIG. 5 demonstrate that the corrosion rate of the coupons generally dips for each of the compositions within an amount of H—CNC of 0.00 and 0.6 percent by weight of the carrier: for the compositions in which the sodium benzoate was in an amount of 0.1 percent by weight of the carrier, the corrosion rate decreased from 1.61 to about 0.35 mpy; for the compositions in which the sodium benzoate was in an amount of 0.2 percent by weight of the carrier, the corrosion rate decreased from 1.64 to about 0.37 mpy; and for the compositions in which the sodium benzoate was in an amount of 0.5 percent by weight of the carrier, the corrosion rate decreased from 1.62 to about 0.28 mpy. The corrosion rate generally increases thereafter as the amount of H—CNC increases past 0.6 percent by weight of the carrier.

According to one preferred ranged, a corrosion-inhibiting composition comprises H—CNC in an amount generally within the range of 0.1 to 0.7 percent by weight of the carrier and sodium benzoate in an amount equal to up to at least 0.5 percent by weight of the carrier.

According to a further preferred range, the H—CNC is included in an amount generally equal to 0.5 to 0.7 percent by weight of the carrier when combined with sodium benzoate in an amount at least to at least up to 0.5 percent by weight of the carrier.

According to a further preferred aspect, the H—CNC is included in an amount generally equal to 0.6 percent by weight of the carrier when combined with sodium benzoate in an amount at least to at least up to 0.5 percent by weight of the carrier.

A synergistic effect was found when the H—CNC was combined in an effective amount with sodium benzoate where the sodium benzoate was included in the compositions in an amount generally equal to 0.5 percent by weight of the carrier: based on the graph trend, when H—CNC in an amount of about 0.57 percent by weight of the carrier alone is added to the sea-salt solution, the corrosion rate appears to be about 0.33 mpy; when sodium benzoate in an amount of 0.5 percent by weight of the carrier is alone added to the sea-salt solution, the corrosion rate was 1.62 mpy; and when both H—CNC in an amount of 0.57 percent by weight of the carrier and sodium benzoate in an amount of 0.5 percent by weight of the carrier, are added to the sea-salt solution, the corrosion rate appears to be 0.28 mpy.

As seen in the graph of FIG. 5, it appears as though a synergistic effect occurs for corrosion-inhibiting compositions comprising sodium benzoate in an amount generally equal to 0.5 percent by weight of the carrier and H—CNC added in an amount generally within the range of 0.47 to 0.68 percent by weight of the carrier: the corrosion rate may range from a high of about 0.36 mpy to a low of about 0.28 mpy in this regard.

EXAMPLE 6

According to another aspect, corrosion rates were measured by immersing various coupons of steel (carbon steel 4130) in typical seawater compositions. The coupons were then removed from the compositions and the loss of mass of the coupons due to corrosion was measured after a set amount of days, in this example 33 days. The coupons were tested at an ambient temperature of approximately 25 degrees Celsius and kept within jars, with each jar having a lid with an aperture extending therethrough. The masses of the coupons were determined before and after the 33 day period to an accuracy of $\pm 10^{-5}$ grams in a manner substantially similar to that describe within Example 1. Mils per year (mpy) rates were obtained thereby following the protocol outlined in the NACE International Corrosion Engineers Reference Book, $2^{nd}$ Edition, as set out on pages 78 and 79 therein.

Each of the jars in this case contained a carrier, in this example water in the amount of 800 grams. The jars each also included 20 grams of sea salt, which corresponds to an amount of sea salt of 2.5 percent by weight of the water in this case. 2% H—CNC stock was next obtained in this example in a manner similar to that described for Example 3. An amount of dried form Na—CNC was added to 2 liters of distilled water so as to be at 2 percent by weight of the water. The composition was continuously stirred for a minimum of twelve hours and then sonicated for a minimum of 10 minutes. Lastly, 300 micro liters of 64% $H_2SO_4$ was added to the composition until a pH of 3 was obtained to arrive at 2% H—CNC stock in suspension in distilled water.

The 2% H—CNC stock was added in various amounts to various sets of two jars. In this case, each set of jars comprised a jar having 0 grams of H—CNC and a jar having 3.3 grams of H—CNC, these values corresponding to jars having 0 and 0.41% of H—CNC, respectively, as a percentage by weight of the water.

Various off-the-shelf corrosion inhibitors were then chosen and added in a set amount, in this example in the amount of 4 grams, to selective ones of the jars. This corresponds to an amount of corrosion inhibitor of 0.5 percent by weight of the carrier.

Exemplary ones of the corrosion inhibitors tested are set out in Table 6 below. Each of the compositions were stirred together and then set aside for a minimum of twenty-four hours before the testing began by suspending the steel coupons in the jars. In this case, the listed corrosion inhibitors include a proprietary corrosion inhibitor by the name of VpCl 309, which contains monoethaneamine benzoate. VpCl 309 may also be purchased at Cortec Corporation, which has an address of 4119 White Bear Parkway, St. Paul, Minn. 55110, United States of America. Monoethaneamine benzoate has a CAS number of 4337-66-0 and it is an off-the-shelf product that may be readily obtained from a variety of chemical supply companies, as would be appreciated by one skilled in the art.

TABLE 6

Steel Corrosion Rate at 25° C. (mpy)

|  | H—CNC (wt. %) | |
| --- | --- | --- |
| Additional Inhibitor | 0 | 0.41 |
| None | 1.78 | 0.54 |
| VpCl 644 0.5% | 2.10 | 0.77 |
| VpCl 309 (monoethaneamine benzoate) 0.5% | 1.75 | 0.46 |
| Ammonium Benzoate 0.5% | 2.21 | 0.86 |

As seen by Table 6, it has been discovered combining a monoethaneamine benzoate containing corrosion inhibitor, in this example VpCl 309, with an effective amount of H—CNC here too reduces corrosion in a synergistic manner: the corrosion rate was 0.54 mpy for the composition having an amount of H—CNC equal to about 0.41 percent by weight of the carrier; the corrosion rate was 1.75 mpy for the composition having an amount of VpCl 309 equal to about 0.5 percent by weight of the carrier; and, surprisingly, the corrosion rate was 0.46 mpy for the composition comprising both H—CNC in an amount equal to about 0.41 percent by weight of the carrier and VpCl 309 in an amount equal to about 0.5 percent by weight of the carrier.

Also as seen by Table 6, the corrosion inhibitors VpCl 644 and ammonium benzoate were similarly tested in these conditions and it was found that corrosion rates here too lowered when the inhibitors were combined with H—CNC.

3.2 Non-Ferrous Metals, Free Form Cellulose Nanocrystals and Corrosion Inhibitors According to a yet another aspect, it has been discovered that cellulose nanocrystals in free form, such as acid form cellulose nanocrystals, also appear to be effective in combination with known corrosion inhibitors for inhibiting corrosion of non-ferrous metals.

A plurality of inhibitors were tested in conditions in which amounts of H—CNC of 0 and 0.5 percent by weight of the carrier were added. In all instances where corrosion rates with inhibitors alone were relatively high, corrosion rates were found to lower when H—CNC was added thereafter, as illustrated by the results shown in Table 7 below.

In view of the illustrative examples set out in Examples 6 and 7, one can thus conclude that cellulose nanocrystals in free form are effective in combination with a further inhibitor for inhibiting corrosion of ferrous and non-ferrous metals.

EXAMPLE 7

Corrosion rates in this example were obtained by immersing coupons of non-ferrous metals in the form of aluminium (aluminium 2024-T3) and brass (UNS C27000 Yellow Brass) in typical seawater compositions. The coupons were then removed from the compositions and the loss of mass of the coupons due to corrosion was measured after a set amount of days, in this example 34 days. The coupons were tested within an enclosure at an elevated temperature of approximately 40 degrees Celsius and were kept within jars. Each jar included a lid with an aperture extending therethrough. The masses of the coupons were determined before and after the 34 day period to an accuracy of $\pm 10^{-5}$ grams in a manner substantially similar to that describe within Example 1. Mils per year (mpy) rates were obtained thereby following the protocol outlined in the NACE International Corrosion Engineers Reference Book, $2^{nd}$ Edition, as set out on pages 78 and 79 therein.

Each of the jars contained a carrier, in this example in the form of water in the amount of 800 grams. Each jar included 28.8 grams of sea salt and this equals an amount of salt of about 3.6 percent by weight of the water, thereby approximating typical sea water. 3% H—CNC stock was obtained in a substantially similar manner as that described for Example 1. Mils per year (mpy) rates were obtained thereby following the protocol outlined in the NACE International Corrosion Engineers Reference Book. The 3% H—CNC stock was added in various amounts to the selective ones of various sets of jars. Each set of jars included a jar having 0 grams of H—CNC and a jar having 4.0 grams of H—CNC, with these amounts corresponding to 0 and 0.5% of H—CNC as a percentage by weight of the water.

Various off-the-shelf corrosion inhibitors were added in a set amount, in this example in the amount of 4 grams, to selective ones of the jars. This corresponds to an amount of corrosion inhibitor of 0.5 percent by weight of the carrier. The following are exemplary ones of the tested inhibitors: VpCl 644, VpCl 309 and ammonium benzoate. This list of corrosion inhibitors is set out by way of example only, and other corrosion inhibitors may similarly be used to demonstrate the ends and effects set out below. Each of the compositions were stirred together and then set aside for a minimum of twenty-four hours before the testing began by suspending the coupons in the jars.

TABLE 7

Aluminum and Brass Corrosion Rates a 40° C. (mpy)

|  | Aluminum | | Brass | |
| --- | --- | --- | --- | --- |
| H—CNC (wt. %) | 0.00 | 0.50 | 0.00 | 0.50 |
| No additional inhibitor | 0.43 | 0.12 | 0.15 | 0.26 |
| VpCl 644 0.5% | 0.10 | 0.10 | 0.00 | 0.00 |
| VpCl 309 (monoethaneamine benzoate) 0.5% | 1.50 | 0.15 | 0.37 | 0.24 |
| Ammonium Benzoate 0.5% | 2.49 | 0.23 | 2.46 | 0.91 |

As seen from the results listed in Table 7 above, the corrosion rate lowered from 1.5 to 0.15 mpy for the aluminium coupons and from 0.37 to 0.24 mpy for the brass coupons when the amount of VpCl 309 in the compositions was generally in the amount of 0.5 percent by weight of the carrier and the amount of H—CNC in the jars increased from 0 to 0.5 percent by weight of the carrier. These results, together with the results shown in Examples 5 and 6, thus enable one to reasonably infer that a corrosion-inhibiting composition comprising free form cellulose nanocrystals and a further corrosion inhibitor in an effective combination therewith, function to inhibit corrosion of ferrous and non-ferrous metals.

In view of the illustrative examples set out in Examples 5 and 7, one can thus also conclude that free form cellulose nanocrystals in an effective combination with ammonium benzoate inhibit corrosion of ferrous metals and non-ferrous metals.

4. Salt-Form Cellulose Nanocrystals as an agent for Corrosion Inhibitors 4.1 Ferrous Metals, Salt-Form Cellulose Nanocrystals and Corrosion Inhibitors According to a still further aspect, it has been discovered that salt form cellulose nanocrystals, such as sodium-form cellulose nanocrystals (Na—CNC), surprisingly, may also be effective in combination with known corrosion inhibitors for inhibiting the corrosion of ferrous metals. In view of the illustrative results shown in the above Examples 5 and 6 and the below Examples 8 and 9, one can thus further conclude that cellulose nanocrystals in either free form or salt form, when combined with a further corrosion inhibitor, function to inhibit corrosion of ferrous metals.

A plurality of inhibitors were tested in conditions in which amounts of Na—CNC of 0 and 0.5 percent by weight of the carrier were added. Samples drawn from the majority of the results, shown in Tables 8 and 9 below, demonstrate that corrosion rates lower for ferrous metals in compositions in which Na—CNC is added to an amount of 0.5 percent by weight of the carrier and a further corrosion inhibitor is added in an amount generally equal to 0.5 percent by weight of the carrier.

A sample set of results illustrative of the beneficial effects of combining salt-form cellulose nanocrystals with a further corrosion inhibitor to inhibit ferrous metals is set out below.

EXAMPLE 8

Corrosion rates were measured in this example by immersing various coupons of steel (carbon steel 4130) in typical seawater compositions. The coupons were then removed from the compositions and the loss of mass of the coupons due to corrosion was measured after a set amount of days, in this example 34 days. The coupons were tested at an ambient temperature of approximately 25 degrees Celsius and kept within jars. Each jar included a lid with an aperture extending therethrough. The masses of the coupons were determined before and after the 34 day period to an accuracy of $\pm 10^{-5}$ grams in a manner substantially similar to that describe in Example 1. Mils per year (mpy) rates were obtained thereby following the protocol outlined in the NACE International Corrosion Engineers Reference Book, $2^{nd}$ Edition, as set out on pages 78 and 79 therein.

Each of the jars in this case contained a carrier, in this example in the form of water in the amount of 800 grams. Each jar also included 20 grams of sea salt, which corresponds to sea salt in generally in the amount of 2.5 percent by weight of the water. Salt-form cellulose nanocrystals, in this example dried, sodium form cellulose nanocrystals (Na—CNC) were selectively added to various sets of two jars. Each set of jars included a jar having 0 grams of Na—CNC and a jar having 4 grams of Na—CNC, with these additions corresponding to Na—CNC in the amounts of 0 and 0.5 as percentages by weight of the carrier.

Various off-the-shelf corrosion inhibitors were then added in a set amount, in this example in the amount of 4 grams, to selective ones of the jars. This corresponds to an amount of corrosion inhibitor of 0.5 percent by weight of the carrier. Each of the compositions were stirred together and then set aside for a minimum of twenty-four hours before the testing began by suspending the steel coupons in the jars. In this case, results from the following sample ones of the corrosion inhibitors are shown in Table 8: VpCl 644, VpCl 309 and ammonium benzoate.

TABLE 8

Steel Corrosion Rate at 25° C. (mpy)

| | Na—CNC (wt. %) | |
|---|---|---|
| Additional Inhibitor | 0 | 0.5 |
| None | 1.78 | 1.75 |
| VpCl 644 0.5% | 2.10 | 1.21 |
| VpCl 309 (monoethaneamine benzoate) 0.5% | 1.75 | 1.65 |

As seen by the above set out Table 8, with no additional inhibitor, the corrosion rate of the coupons did not vary significantly when Na—CNC was added to the salt solution: the corrosion rate varied from 1.78 to 1.75 mpy when Na—CNC was increased to an amount of 0.5 percent by weight of the carrier.

However, the corrosion rate lowered from 2.10 to 1.21 mpy when the amount of VpCl 644 within the salty water was kept at a fixed amount of generally 0.5 percent by weight of the carrier and the amount of Na—CNC in the jars increased from 0 to 0.5 percent by weight of the carrier. The corrosion rate also lowered from 1.75 to 1.65 mpy when the amount of VpCl 309 was kept at a fixed amount of generally 0.5 percent by weight of the carrier and the amount of Na—CNC in the jars increased from 0 to 0.5 percent by weight of the carrier. These sample results, together with those set out in Example 9, enable one to reasonably infer that the cellulose nanocrystals in salt form combined with a further corrosion inhibitor in an effective combination function to inhibit corrosion of ferrous metals.

EXAMPLE 9

Corrosion rates were measured in this example by immersing various coupons of steel (carbon steel 4130) in typical seawater compositions. The coupons were then removed from the compositions and the loss of mass of the coupons due to corrosion was measured after a set amount of days, in this example 33 days. The coupons were tested at an ambient temperature of approximately 25 degrees Celsius and kept within sealed jars in this example. The masses of the coupons were determined before and after the 33 day period to an accuracy of $\pm 10^{-5}$ grams in a manner substantially similar to that describe in Example 1. Mils per year (mpy) rates were obtained thereby following the protocol outlined in the NACE International Corrosion Engineers Reference Book, $2^{nd}$ Edition, as set out on pages 78 and 79 therein.

Each of the jars in this case contained a carrier, in this example in the form of 500 grams of water. Each jar also included 25 grams of sea salt, which corresponds to sea salt in the amount of 5.0 percent by weight of the water. Salt-form CNC, in this example dried Na—CNC, was selectively added to various sets of two jars. Each set of jars included a jar having 0 grams of Na—CNC and a jar having 34 grams of Na—CNC, with these additions corresponding to amounts of Na—CNC of 0 and 6.8 as percentages by weight of the carrier.

A common azole, in this example in the form of tolytriazole, was added in a set amount, in this example in the amount of 34 grams, to selective ones of the jars. This corresponds to an amount of corrosion inhibitor of 6.8 percent by weight of the carrier. Tolytriazole has a CAS number of CAS 29385-43-1 and it is an off-the-shelf product that may be readily obtained from a variety of chemical supply companies, as would be appreciated by one skilled in the art.

The results of the testing are set out below in Table 9.

TABLE 9

| | Steel Corrosion Rate at 25° C. (mpy) | |
|---|---|---|
| | Na—CNC (wt. %) | |
| Additional Inhibitor | 0 | 6.8 |
| None | 1.20 | 1.70 |
| Tolytriazole | 0.90 | 0.60 |

As seen in the table, with no additional inhibitor, the corrosion rate of the coupons in the salt solution increased from 1.20 to 1.70 mpy when Na—CNC added to the jars increased from an amount of 0 to 6.8 percent by weight of the carrier.

Surprisingly, the corrosion rate lowered from 0.90 to 0.60 mpy when the amount of tolytriazole was kept at a fixed amount of generally about 0.5 percent by weight of the carrier and the amount of Na—CNC in the jars increased from generally 0 to 0.5 percent by weight of the carrier. These results point to the conclusion that salt form cellulose nanocrystals and azole in an effective combination function to inhibit corrosion of ferrous metals in a synergistic manner: a composition comprising tolytriazole alone in an amount of about 6.8 percent by weight of the carrier has a corrosion rate of 0.90 mpy; a composition comprising Na—CNC alone in an amount of about 6.8 percent by weight of the carrier has a corrosion rate of 1.70 mpy; and a composition combining tolytriazole and Na—CNC in the above set out amounts, surprisingly, has a corrosion rate of 0.60 mpy.

4.2 Non-Ferrous Metals, Salt-Form Cellulose Nanocrystals and Corrosion Inhibitors Testing was also performed on aluminium (aluminium 2024-T3) and brass (UNS C27000 Yellow Brass) coupons in compositions comprising: 1) a set amount of Na—CNC alone, in this example Na—CNC in an amount of 0.5 percent by weight of the carrier; 2) the set amount of Na—CNC and a further inhibitor in a fixed amount, in this example in an amount of 0.5 percent by weight of the carrier; and 3) the further inhibitor alone in the fixed amount. The testing was performed for a variety of off-the-shelf inhibitors, in a manner substantially similar to that set out in Example 8.

Few of the jar tests performed with aluminium coupons resulted in large corrosion rates and/or differences in corrosion rates when Na—CNC was added in the tested conditions. However, Na—CNC combined with almost half the tested inhibitors, including ammonium benzoate, appears to have resulted in more corrosion to aluminium when Na—CNC was added in an amount equal to about 0.5 percent by weight of the carrier.

Generally none of the brass coupon testing with Na—CNC resulted in any meaningful differences in corrosion rates when the Na—CNC in the amount of 0.5 percent by weight of the carrier and off-the-shelf inhibitors in the amount of 0.5 percent by weight of the carrier were combined under the above set-out test conditions. In this case, the majority of the corrosion rates were low with or without Na—CNC.

However, when Na—CNC was added in an amount of 0.5 percent by weight of the carrier to a composition having ammonium benzoate in an amount of 0.5 percent by weight of the carrier, the corrosion rate lowered from 0.70 to 0.22 mpy. The corrosion rate was 1.75 mpy in the jar containing Na—CNC alone in the salt solution. These illustrative results demonstrate that salt form cellulose nanocrystals combined with ammonium benzoate in an effective combination function to inhibit corrosion of non-ferrous metals such as copper-based metals, in a synergistic manner.

Acid form cellulose nanocrystals were the type of free form cellulose nanocrystals tested herein. However, it is envisaged that base form cellulose nanocrystals would also function to inhibit corrosion in an analogous manner.

The word "comprising" as set out the specification and claims is used in an open-ended sense and is synonymous with the word "includes".

ADDITIONAL DESCRIPTION

Examples of corrosion-inhibiting compositions have been described. The following clauses are offered as further description.

(1) A corrosion inhibitor comprising a plurality of cellulose nanocrystals.

(2) A corrosion inhibitor essentially consisting of a plurality of cellulose nanocrystals.

(3) The corrosion inhibitor of any least one of the preceding clauses for use with a carrier.

(4) The corrosion inhibitor of clause 3 wherein the carrier is water.

(5) The corrosion inhibitor of at least one of clauses 3 and 4, wherein the cellulose nanocrystals are included in an amount generally equal to up to 1 percent by weight of the carrier.

(6) The corrosion inhibitor of at least one of clauses 3 and 4, wherein the cellulose nanocrystals are included in an amount generally equal to 0.2 to 0.7 percent by weight of the carrier.

(7) The corrosion inhibitor of at least one of clauses 3 and 4 wherein the cellulose nanocrystals are included in an amount generally equal to 0.6 percent by weight of the carrier.

(8) A corrosion-inhibiting composition comprising the corrosion inhibitor of at least one of clauses 1 and 2 and a carrier.

(9) The corrosion-inhibiting composition of clause 8 wherein the carrier is water.

(10) The corrosion inhibitor of at least one of clauses 3 and 4, wherein the amount of cellulose nanocrystals in the composition is equal to at least 0.2 percent by weight of the carrier for ambient temperature applications.

(11) The corrosion inhibitor of at least one of clauses 3 and 4, wherein the amount of cellulose nanocrystals in the composition is generally equal to at least 0.5 percent by weight of the carrier for applications having a temperature of about 40 degrees Celsius.

(12) The corrosion inhibitor of at least one of clauses 3 and 4 wherein the effective amount of cellulose nanocrystals needed by weight of the carrier increases as the temperature of the environment within which the inhibitor is to be used increases.

(13) The corrosion inhibitor of at least one of the preceding clauses, wherein the cellulose nanocrystals are attracted to ionic components of a corroding metal surface.

(14) The corrosion inhibitor of clause 13, wherein the cellulose nanocrystals form a coating on the metal surface and inhibit electrochemical reactions from driving the corrosion process thereby.

(15) The corrosion inhibitor of at least one of the preceding clauses wherein the cellulose nanocrystals are negatively charged and function as an anodic corrosion inhibitor.

(16) The corrosion inhibitor of at least one of clauses 1 to 15 wherein the cellulose nanocrystals are positively charged and function as a cathodic corrosion inhibitor.
(17) The corrosion inhibitor of at least one of the preceding clauses, wherein the cellulose nanocrystals are in free form.
(18) The corrosion inhibitor of at least one of the preceding clauses, wherein the cellulose nanocrystals are charged.
(19) The corrosion inhibitor of at least one of the preceding clauses wherein the cellulose nanocrystals are in acid form.
(20) The corrosion inhibitor of at least one of the preceding clauses, wherein the inhibitor includes a compound of formula $R_1$—$R_2$ in which $R_1$ is a hydrogen atom and $R_2$ is a cellulose nanocrystal.
(21) The corrosion inhibitor of at least one of the preceding clauses wherein the cellulose nanocrystals are in base form.
(22) The corrosion inhibitor of at least one of clauses 1 to 16, wherein the cellulose nanocrystals are in salt form.
(23) The corrosion inhibitor of at least one of the preceding clauses, wherein the cellulose nanocrystals are in dried form.
(24) The corrosion inhibitor of at least one of the preceding clauses, including a compound of formula $R_3$—$R_2$ in which $R_3$ is a sodium atom and $R_2$ is a cellulose nanocrystal.
(25) The corrosion inhibitor of at least one of the preceding clauses wherein the inhibitor is for use in inhibiting corrosion in ferrous metals.
(26) The corrosion inhibitor of at least one of the preceding clauses wherein the inhibitor is for use in inhibiting corrosion in non-ferrous metals.
(27) The corrosion inhibitor of clause 26 wherein the non-ferrous metals are aluminium-based metals.
(28) The corrosion inhibitor of at least one of clauses 26 and 27, wherein the non-ferrous metals are copper-based metals.
(29) The corrosion inhibitor of at least one of the preceding clauses in an effective amount to inhibit corrosion of metals.
(30) The corrosion inhibitor of at least one of the preceding clauses and a further corrosion inhibitor in an effective combination to inhibit corrosion of metals.
(31) A corrosion inhibitor comprising a plurality of nanocrystals fibrils.
(32) The corrosion inhibitor of clause 31 wherein the fibrils are charged.
(33) The corrosion inhibitor of at least one of the preceding clauses and a further corrosion inhibitor in a synergistically effective combination to inhibit corrosion of metals.
(34) The use of the corrosion inhibitor of at least one of the preceding clauses in a paint formulation.
(35) A corrosion-inhibiting cutting fluid composite comprising a cutting fluid; and the corrosion inhibitor of at least one of the preceding clauses.
(36) The cutting fluid of clause 35, wherein the charged cellulose nanocrystals fibrils are configured to be attracted to ionic components of a corroding metal surface.
(37) The use of at least one form of cellulose nanocrystals as a corrosion inhibitor.
(38) The use of free form of cellulose nanocrystals as a corrosion inhibitor.
(39) The use of acid form of cellulose nanocrystals as a corrosion inhibitor.
(40) A corrosion-inhibiting agent comprising cellulose nanocrystals.
(41) A corrosion-inhibiting agent essentially consisting of a plurality of cellulose nanocrystals.
(42) A corrosion-inhibiting composition comprising a corrosion inhibitor and the agent of any one of clauses 40 and 41 in an effective combination to inhibit corrosion of metals.
(43) The corrosion-inhibiting composition of clause 42 for use with a carrier.
(44) The corrosion-inhibiting composition of clause 43, wherein the cellulose nanocrystals are included in an amount equal to up to at least one percent by weight of the carrier.
(45) The corrosion-inhibiting composition of clause 43, wherein the cellulose nanocrystals are included in an amount equal to up to 0.7 percent by weight of the carrier.
(46) The corrosion-inhibiting composition of at least one of clauses 42 to 45 wherein the corrosion inhibitor comprises ammonium benzoate.
(47) The corrosion-inhibiting composition of clause 43, wherein the corrosion inhibitor comprises ammonium benzoate and wherein the cellulose nanocrystals are included in an amount generally equal to up to 0.5 percent by weight of the carrier.
(48) The corrosion-inhibiting composition of clause 43, wherein the corrosion inhibitor comprises ammonium benzoate and wherein the cellulose nanocrystals are included in an amount generally equal to 0.1 to 0.6 percent by weight of the carrier.
(49) The corrosion-inhibiting composition of clause 43, wherein the corrosion inhibitor comprises ammonium benzoate included in an amount generally equal to up to 0.5 percent by weight of the carrier and wherein the cellulose nanocrystals are included in an amount generally equal to 0.3 to 0.6 percent by weight of the carrier.
(50) The corrosion-inhibiting composition of clause 43, wherein the corrosion inhibitor comprises ammonium benzoate included in an amount generally equal to up to 0.5 percent by weight of the carrier and wherein the cellulose nanocrystals are included in an amount generally equal to 0.1 percent by weight of the carrier.
(51) The corrosion-inhibiting composition of at least one of clauses 42 to 45 wherein the corrosion inhibitor comprises sodium benzoate.
(52) The corrosion-inhibiting composition of clause 43, wherein the corrosion inhibitor comprises sodium benzoate and wherein the cellulose nanocrystals are included in an amount generally equal to up to 1.0 percent by weight of the carrier.
(53) The corrosion-inhibiting composition of clause 43, wherein the corrosion inhibitor comprises sodium benzoate and wherein the cellulose nanocrystals are included in an amount generally equal to 0.1 to 0.7 percent by weight of the carrier.
(54) The corrosion-inhibiting composition of clause 43, wherein the corrosion inhibitor comprises sodium benzoate and wherein the cellulose nanocrystals are included in an amount generally equal to 0.5 to 0.7 percent by weight of the carrier.
(55) The corrosion-inhibiting composition of at least one of clauses 52 to 54 wherein the sodium benzoate is included in an amount of up to at least 0.5 percent by weight of the carrier.

(56) The corrosion-inhibiting composition of at least one of clauses 42 to 45, wherein the corrosion inhibitor is an azole.

(57) The corrosion-inhibiting composition of clause 56, wherein the cellulose nanocrystals are in either free form or salt form, the corrosion-inhibiting composition inhibiting corrosion of ferrous metals.

(58) The corrosion-inhibiting composition of clause 43, wherein the corrosion inhibitor comprises azole and wherein the cellulose nanocrystals are included in an amount generally equal to up to 1 percent by weight of the carrier.

(59) The corrosion-inhibiting composition of clause 43, wherein the corrosion inhibitor comprises azole and wherein the cellulose nanocrystals are included in an amount substantially equal to greater than 0.2 percent by weight of the carrier.

(60) The corrosion-inhibiting composition of clause 43, wherein the corrosion inhibitor comprises azole and wherein the cellulose nanocrystals are in an amount generally equal to 0.1 to 0.6 percent by weight of the carrier.

(61) The corrosion-inhibiting composition of clause 43, wherein the corrosion inhibitor comprises azole and wherein the cellulose nanocrystals are included in an amount generally equal to 0.5 percent by weight of the carrier.

(62) The corrosion-inhibiting composition of clause 43, wherein the corrosion inhibitor comprises azole included in an amount generally equal to up to at least 0.2 percent by weight of the carrier and wherein the cellulose nanocrystals are included in an amount generally within the range of 0.2 to 1.0 percent by weight of the carrier.

(63) The corrosion-inhibiting composition of clause 43, wherein the corrosion inhibitor comprises azole included in an amount generally equal to 0.2 percent by weight of the carrier and wherein the cellulose nanocrystals are included in an amount generally within the range of 0.2 to 0.5 percent by weight of the carrier.

(64) The corrosion-inhibiting composition of clause 43, wherein the corrosion inhibitor comprises azole included in an amount of up to at least 0.2 percent by weight of the carrier and wherein the cellulose nanocrystals are included in an amount of up to at least 1.0 percent by weight of the carrier.

(65) The corrosion-inhibiting composition of clause 43, wherein the corrosion inhibitor comprises azole included in an amount of up to about 0.5 percent by weight of the carrier and wherein the cellulose nanocrystals are included in an amount of generally between 0.25 and 1.0 percent by weight of the carrier.

(66) The corrosion-inhibiting composition of at least one of clauses 56 to 65, wherein the azole is benzotriazole.

(67) The corrosion-inhibiting composition of at least one of clauses 56 to 65, wherein the azole is tolytriazole.

(68) The corrosion-inhibiting composition of at least one of clauses 42 to 45 wherein the corrosion inhibitor contains monoethaneamine benzoate.

(69) The corrosion-inhibiting composition of at least one of clauses 42 to 45 wherein the corrosion inhibitor is VpCl 644.

(70) The corrosion-inhibiting composition of at least one of clauses 42 to 45 wherein the corrosion inhibitor is VpCl 309.

(71) The corrosion-inhibiting composition of clause 43 wherein the corrosion inhibitor comprises VpCl 644 in an amount in the range of up to at least 0.5 percent of the weight of the carrier and wherein the cellulose nanocrystals are included in an amount of up to at least 1.0 percent by weight of the carrier.

(72) The corrosion-inhibiting composition of clause 43 wherein the corrosion inhibitor comprises VpCl 644 in an amount in the range of up to at least 0.5 percent of the weight of the carrier and wherein the cellulose nanocrystals are included in an amount generally in the range of 0.5 to 1.0 percent by weight of the carrier.

(73) The corrosion-inhibiting composition of at least one of clauses 42 to 72, wherein the corrosion inhibitor is of the type adapted for salt or brine water environments.

(74) The corrosion-inhibiting composition of at least one of clauses 42 to 72, wherein the corrosion inhibitor is of the type adapted for oil and gas industry applications.

(75) The corrosion-inhibiting composition of at least one of clauses 42 to 72, wherein the corrosion inhibitor is of the type adapted for cleaners.

(76) The corrosion-inhibiting composition of at least one of clauses 42 to 72, wherein the corrosion inhibitor is of the type adapted for coatings.

(77) The corrosion-inhibiting composition of at least one of clauses 42 to 72, wherein the corrosion inhibitor is of the type adapted for detergents.

(78) The corrosion-inhibiting composition of at least one of clauses 42 to 72, wherein the corrosion inhibitor is of the type adapted for water-treatment applications.

(79) The corrosion-inhibiting composition of at least one of clauses 42 to 72, wherein the corrosion inhibitor is of the type adapted for food-contacting metallic articles.

(80) The corrosion-inhibiting composition of at least one of clauses 42 to 72, wherein the corrosion inhibitor is of the type adapted for anti-freeze.

(81) The corrosion-inhibiting composition of at least one of clauses 42 to 72, wherein the corrosion inhibitor is of the type adapted for coolants.

(82) The corrosion-inhibiting composition of at least one of clauses 42 to 72, wherein the corrosion inhibitor is of the type adapted for emulsion paints.

(83) The corrosion-inhibiting composition of at least one of clauses 42 to 72, wherein the corrosion inhibitor is of the type adapted for cutting oils.

(84) The corrosion-inhibiting composition of at least one of clauses 42 to 72, wherein the corrosion inhibitor is of the type adapted for metals in impregnated paper.

(85) The corrosion-inhibiting composition of at least one of clauses 42 to 84, wherein the corrosion inhibitor is biodegradable.

(86) The corrosion-inhibiting composition of at least one of clauses 42 to 85, wherein the cellulose nanocrystals are in free form.

(87) The corrosion-inhibiting composition of at least one of clauses 42 to 86, wherein the cellulose nanocrystals are attracted to ionic components of a corroding metal surface.

(88) The corrosion-inhibiting composition of clause 86, wherein the cellulose nanocrystals form a coating on the metal surface and inhibit electrochemical reactions from driving the corrosion process thereby.

(89) The corrosion-inhibiting composition of at least one of clauses 42 to 88, wherein the cellulose nanocrystals are charged.

(90) The corrosion-inhibiting composition of at least one of clauses 42 to 89, wherein the cellulose nanocrystals are negatively charged and function as an anodic corrosion inhibitor.

(91) The corrosion-inhibiting composition of at least one of clauses 42 to 89 wherein the cellulose nanocrystals are positively charged and function as a cathodic corrosion inhibitor.
(92) The corrosion-inhibiting composition of at least one of clauses 42 to 89 wherein the cellulose nanocrystals are in acid form.
(93) The corrosion-inhibiting composition of at least one of clauses 42 to 89, wherein the inhibitor includes a compound of formula $R_1$—$R_2$ in which $R_1$ is a hydrogen atom and $R_2$ is a cellulose nanocrystal.
(94) The corrosion-inhibiting composition of at least one of clauses 42 to 89 wherein the cellulose nanocrystals are in base form.
(95) The corrosion-inhibiting composition of at least one of clauses 42 to 85 wherein the cellulose nanocrystals are in salt form.
(96) The corrosion-inhibiting composition of at least one of clauses 42 to 85 wherein the cellulose nanocrystals are in either free or salt form
(97) The corrosion-inhibiting composition of at least one of clauses 42 to 96, wherein the cellulose nanocrystals are in dried form.
(98) The corrosion-inhibiting composition of at least one of clauses 42 to 97, including a compound of formula $R_3$—$R_2$ in which $R_3$ is a sodium atom and $R_2$ is a cellulose nanocrystal.
(99) The corrosion-inhibiting composition of at least one of clauses 42 to 98, wherein the inhibitor is for use in inhibiting corrosion in ferrous metals.
(100) The corrosion-inhibiting composition of at least one of clauses 42 to 99 wherein the inhibitor is for use in inhibiting corrosion in non-ferrous metals.
(101) The corrosion-inhibiting composition of clause 100 wherein the non-ferrous metals include aluminium-based metals.
(102) The corrosion-inhibiting composition of any one of clauses 100 and 101 wherein the non-ferrous metals include copper-based metals.
(103) The use of cellulose nanocrystals as an anti-corrosion agent for metals.
(104) Cellulose nanocrystals in an effective corrosion-inhibiting composition with a corrosion inhibitor for use as a corrosion-inhibiting composition.
(105) A method of preventing corrosion of metals by applying to the metal the agent of at least one of clauses 40 and 41.
(106) In combination, a corrosion inhibitor and the agent of at least one of clauses 40 and 41.
(107) A process for inhibiting corrosion of metal equipment where water can reside, the process including adding an effective corrosion inhibiting amount of charged cellulose nanocrystals.
(108) The process of clause 107, further including dispersing the cellulose nanocrystals within the water.
(109) The process of at least one of clauses 107 and 108 the cellulose nanocrystals are provided in free form.
(110) The process of at least one of clauses 107 to 109, further including adding a further corrosion inhibitor in an effective combination with the cellulose nanocrystals.
(111) The process of clause 110, further including dispersing the further corrosion inhibitor within the water.

It will be understood by someone skilled in the art that many of the details provided above are by way of example only and are not intended to limit the scope of the invention which is to be determined with reference to at least the following claims.

What is claimed is:

1. The use of acid-form cellulose nanocrystals as a corrosion inhibitor for inhibiting corrosion of a metal object made of steel, the cellulose nanocrystals being obtained via acid hydrolysis, each of said cellulose nanocrystals having a diameter in the range of 4 nm to about 60 nm and a length in the range of about 150 nm to about 350 nm, and the use comprising:
    using sulfuric acid to impart surface sulfate ester groups to the cellulose nanocrystals during the acid hydrolysis;
    dispersing in a colloidal suspension an effective corrosion inhibiting amount of said cellulose nanocrystals having said surface sulfate ester groups within a composition comprising a carrier essentially consisting of water, the cellulose nanocrystals being in an amount equal to or greater than 0.1 percent by weight of the carrier and equal to or less than 1.0 percent by weight of the carrier; and
    applying an effective corrosion inhibiting amount of said composition comprising said cellulose nanocrystals having said surface sulfate ester groups to the metal object, the composition functioning to inhibit corrosion of said metal object by between 8.1% and 79.4% when the metal object is exposed to temperature of 25 degrees Celsius.

2. The use as claimed in claim 1, wherein the metal object is exposed to a corrosion environment comprising salt.

3. The use as claimed in claim 1, wherein the acid-form cellulose nanocrystals are used in a corrosion environment comprising seawater.

4. The use of acid-form cellulose nanocrystals as a corrosion inhibitor for inhibiting corrosion of a metal object made of steel, the cellulose nanocrystals being obtained via acid hydrolysis, each of said cellulose nanocrystals having a diameter in the range of 4 nm to about 60 nm and a length in the range of about 150 nm to about 350 nm, and the use comprising:
    using sulfuric acid to impart surface sulfate ester groups to the cellulose nanocrystals during the acid hydrolysis;
    dispersing in a colloidal suspension an effective corrosion inhibiting amount of said cellulose nanocrystals having said surface sulfate ester groups within a composition comprising a carrier essentially consisting of water, the cellulose nanocrystals being dispersed in an amount in the range of equal to or greater than 0.1 percent by weight of the carrier and equal to or less than 1.0 percent by weight of the carrier; and
    applying an effective corrosion inhibiting amount of said composition comprising said cellulose nanocrystals having said surface sulfate ester groups to the metal object, wherein when the acid-form cellulose nanocrystals having said surface sulfate ester groups are dispersed in the composition in an amount equal to or greater than 0.1 percent by weight of the carrier and equal to or less than 0.2 percent by weight of the carrier and the composition is then applied to the metal object, the composition so configured functions to inhibit corrosion of said metal object by between 8.1% and 61.9% when the metal object is exposed to a temperature of 25 degrees Celsius and wherein when the acid-form cellulose nanocrystals having said surface sulfate ester groups are dispersed in the composition in an amount equal to or greater than 0.2 percent by weight of the carrier and equal to or less than 1.0 percent by weight of the carrier and the composition is then applied to the metal object, the composition so configured functions to inhibit corrosion of said metal object by between 61.9% and 79.4% when the metal object is exposed to said temperature.

5. The use as claimed in claim 4, wherein the metal object is exposed to a corrosion environment comprising salt.

6. The use as claimed in claim 4, wherein the acid-form cellulose nanocrystals are used in a corrosion environment comprising seawater.

7. The use of acid-form cellulose nanocrystals as a corrosion inhibitor for inhibiting corrosion of a metal object made of steel, the cellulose nanocrystals being obtained via acid hydrolysis, each of said cellulose nanocrystals having a diameter in the range of 4 nm to about 60 nm and a length in the range of about 150 nm to about 350 nm, and the use comprising:

using sulfuric acid to impart surface sulfate ester groups to the cellulose nanocrystals during the acid hydrolysis;

dispersing in a colloidal suspension an effective corrosion inhibiting amount of said cellulose nanocrystals having said surface sulfate ester groups within a composition comprising a carrier essentially consisting of water, the cellulose nanocrystals being in an amount equal to or greater than 0.1 percent by weight of the carrier and equal to or less than 1.0 percent by weight of the carrier; and applying an effective corrosion inhibiting amount of said composition comprising said cellulose nanocrystals having said surface sulfate ester groups to the metal object, the composition functioning to inhibit corrosion of said metal object by between 16.5% and 75.7% when the metal object is exposed to a temperature equal to 40 degrees Celsius.

8. The use as claimed in claim 7, wherein the metal object is exposed to a corrosion environment comprising salt.

9. The use as claimed in claim 7, wherein the acid-form cellulose nanocrystals are used in a corrosion environment comprising seawater.

* * * * *